US012706245B2

(12) United States Patent
Sato et al.

(10) Patent No.: US 12,706,245 B2
(45) Date of Patent: Aug. 11, 2026

(54) MULTILAYER ELECTRONIC COMPONENT

(71) Applicant: KYOCERA Corporation, Kyoto (JP)

(72) Inventors: Hisashi Sato, Kirishima (JP); Tatsuya Suzuki, Kirishima (JP); Daiki Tsurubayashi, Kirishima (JP); Tomoyuki Miwa, Hiroshima (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 19/243,283

(22) Filed: Jun. 19, 2025

(65) Prior Publication Data

US 2026/0004972 A1 Jan. 1, 2026

Related U.S. Application Data

(63) Continuation of application No. PCT/JP2025/008402, filed on Mar. 7, 2025.

(30) Foreign Application Priority Data

Jun. 27, 2024 (JP) ................................ 2024-104332

(51) Int. Cl.

| | |
|---|---|
| ***H01G 4/008*** | (2006.01) |
| ***H01G 4/12*** | (2006.01) |
| ***H01G 4/232*** | (2006.01) |
| ***H01G 4/248*** | (2006.01) |
| ***H01G 4/30*** | (2006.01) |

(52) U.S. Cl.

CPC ............... *H01G 4/008* (2013.01); *H01G 4/12* (2013.01); *H01G 4/232* (2013.01); *H01G 4/248* (2013.01); *H01G 4/30* (2013.01)

(58) Field of Classification Search

CPC .......... H01G 4/008; H01G 4/12; H01G 4/232; H01G 4/248; H10G 4/30

USPC ............. 361/305, 321.1, 301.4, 306.3, 321.3

See application file for complete search history.

(56) References Cited

U.S. PATENT DOCUMENTS

| | | | | |
|---|---|---|---|---|
| 8,633,636 | B2 * | 1/2014 | Iwanaga ................ | H01G 4/012 29/25.35 |
| 2013/0062994 | A1 | 3/2013 | Ogawa et al. | |
| 2014/0293503 | A1 | 10/2014 | Sasabayashi et al. | |
| 2018/0108483 | A1 * | 4/2018 | Sasabayashi .......... | H01G 4/248 |
| 2019/0027312 | A1 * | 1/2019 | Muramatsu .............. | H01G 4/12 |

(Continued)

FOREIGN PATENT DOCUMENTS

| | | |
|---|---|---|
| JP | 2007-036003 A | 2/2007 |
| JP | 2012-199353 A | 10/2012 |

(Continued)

*Primary Examiner* — Arun Ramaswamy

(74) *Attorney, Agent, or Firm* — Volpe Koenig

(57) ABSTRACT

A multilayer electronic component includes a multilayer body including inner electrodes and dielectric layers alternately stacked, underlying electrodes, and outer electrodes. The inner electrodes include first inner electrodes and second inner electrodes. The underlying electrodes include a first underlying electrode and a second underlying electrode. The outer electrodes include a first outer electrode and a second outer electrode. The first underlying electrode and the second underlying electrode each include multiple sintered bodies composed of dielectric particles. At least part of the multiple sintered bodies are located on an interface between each underlying electrode and the multilayer body.

18 Claims, 13 Drawing Sheets

(56) References Cited

U.S. PATENT DOCUMENTS

| | | | | |
|---|---|---|---|---|
| 2020/0234883 | A1* | 7/2020 | Muramatsu | H01G 4/008 |
| 2021/0202172 | A1* | 7/2021 | Kanzaki | H01G 4/30 |
| 2021/0327648 | A1* | 10/2021 | Kanzaki | H01G 4/0085 |
| 2023/0207214 | A1* | 6/2023 | Doi | H01G 4/30 361/321.2 |
| 2023/0268132 | A1 | 8/2023 | Takei et al. | |

FOREIGN PATENT DOCUMENTS

| | | | |
|---|---|---|---|
| JP | 2014-212298 | A | 11/2014 |
| JP | 2023-122205 | A | 9/2023 |

* cited by examiner 10, 10A
3, 13
4, 14
A
7a, 17a
B
P
8a, 18a
5a, 15a
5b, 15b
2, 12
z
y
x

MULTILAYER ELECTRONIC COMPONENT

CROSS-REFERENCE TO RELATED PATENT APPLICATION

This application is a Bypass Continuation of International Patent Application No. PCT/JP2025/008402, filed on Mar. 7, 2025, which claims priority to Japanese Application No. 2024-104332, filed on Jun. 27, 2024, the entire contents of which are hereby incorporated by reference.

BACKGROUND OF THE INVENTION

1. Field of the Invention

The present disclosure relates to a multilayer electronic component.

2. Description of the Related Art

A multilayer ceramic capacitor, which is an example of a multilayer electronic component, includes a multilayer body including multiple inner electrodes and multiple dielectric layers alternately stacked and outer electrodes located on surfaces of the multilayer body. Forming the outer electrodes as plating layers reduces the thickness of the outer electrodes, making it possible to downsize the multilayer ceramic capacitor without reducing the capacitance.

A technique is known for forming outer electrodes as plating layers, in which underlying electrodes serving as undercoats for the outer electrodes are formed on surfaces of the multilayer body to increase the adhesion between the outer electrodes and the multilayer body (see, for example, Japanese Unexamined Patent Application Publication No. 2014-212298).

SUMMARY OF THE INVENTION

In the present disclosure, a multilayer electronic component includes a multilayer body, multiple underlying electrodes, and multiple outer electrodes. The multilayer body includes multiple inner electrodes and multiple dielectric layers alternately stacked and includes a first surface and a second surface opposed to each other in a stacking direction. The multiple underlying electrodes include a first underlying electrode located on the first surface. The multiple outer electrodes are each connected to one or more of the multiple inner electrodes and one or more of the multiple underlying electrodes. In a cross-sectional view in the stacking direction, the first underlying electrode contains multiple sintered bodies composed of dielectric particles, and at least part of the multiple sintered bodies are located on an interface between the first underlying electrode and the multilayer body.

BRIEF DESCRIPTION OF THE DRAWINGS

FIG. 17 is a perspective view of a base component of the multilayer ceramic capacitor in

FIG. 16;

DESCRIPTION OF THE PREFERRED EMBODIMENTS

Figure 1:
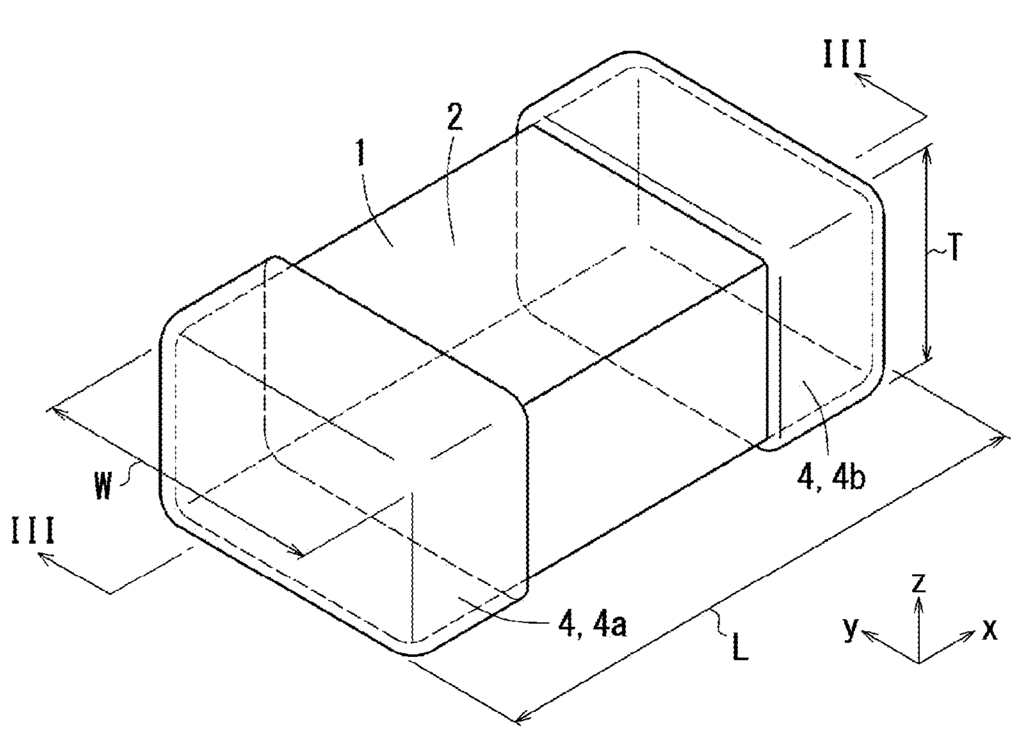
FIG. 1 is a perspective view of a multilayer ceramic capacitor of a first embodiment.

Hereinafter, embodiments of multilayer electronic components according to the present disclosure will be described with reference to the drawings. Although the following describes a multilayer ceramic capacitor as an example of a multilayer electronic component, the multilayer electronic component of the present disclosure is not limited to multilayer ceramic capacitors and is also applicable to various multilayer electronic components such as multilayer piezoelectric elements, multilayer thermistor elements, multilayer chip coils, and ceramic multilayer substrates. The figures used in the following description are schematic. Hence, the ratios of dimensions and the like in the drawings are not necessarily the same as those of the actual ones. In the present specification, a Cartesian coordinate system xyz is defined in some drawings, for convenience. The x-axis direction is also referred to as the longitudinal direction. The y-axis direction is also referred to as the width direction. The z-axis direction is also referred to as the height direction or the stacking direction. In the following, on the assumption that the positive side of the z-axis direction is the upward direction, terms such as the upper side and the lower side are used in some cases.

Embodiments described relatively later will be described with a focus on the differences from embodiments relatively earlier. Items not specifically referred to may be considered to be based on the description of embodiments described earlier or may be inferred from the description of embodiments described earlier. In addition, the description of an embodiment may be applied to another embodiment unless a contradiction or the like occurs.

Figure 2:
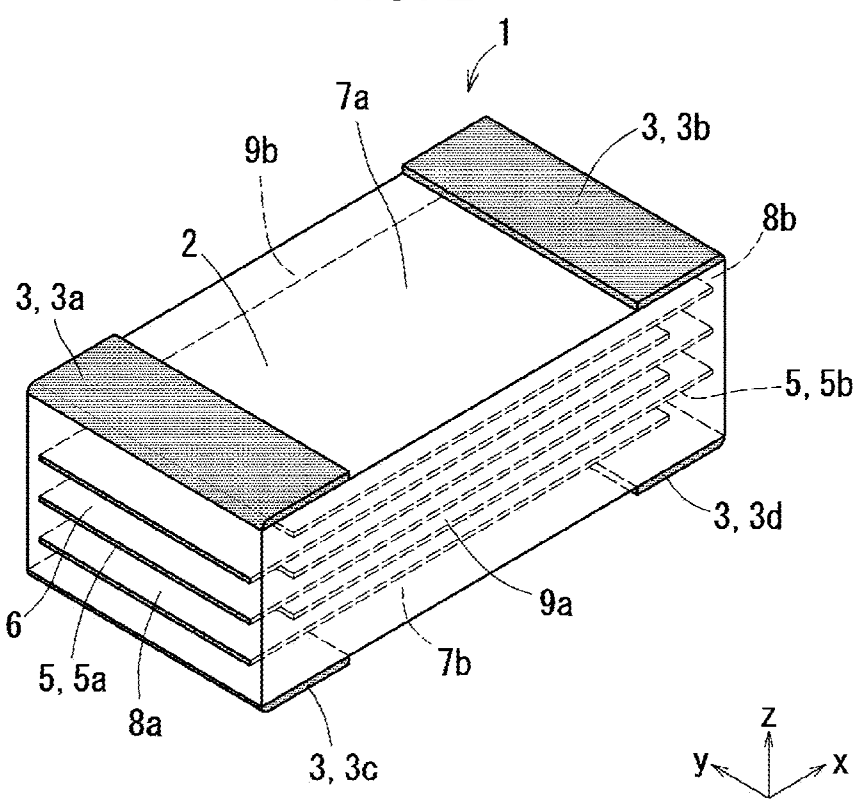
FIG. 2 is a perspective view of a base component of the multilayer ceramic capacitor in FIG. 1.
Figure 3:
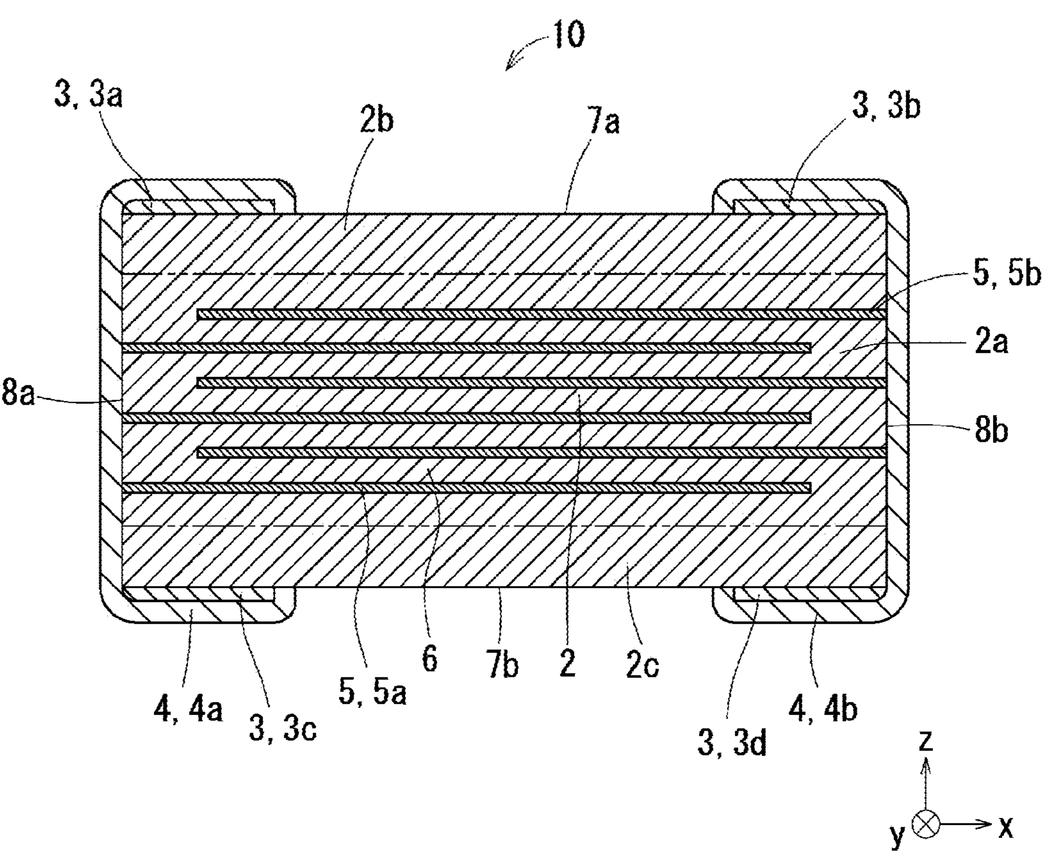
FIG. 3 is a cross-sectional view taken along cross-section line III-III in FIG. 1.
Figures 4, 5:
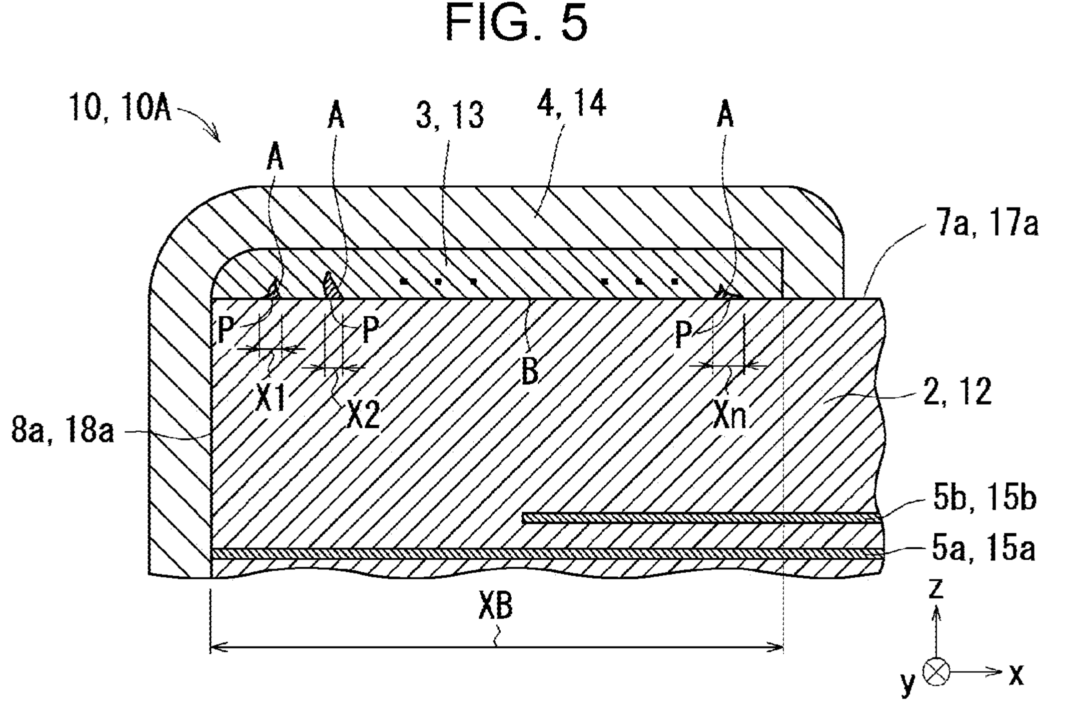
FIG. 4 is an enlarged cross-sectional view of an important part of the multilayer ceramic capacitor in FIG. 3.
FIG. 5 is a diagram for explaining the configuration of the interface between an underlying electrode and a multilayer body.
Figure 6:
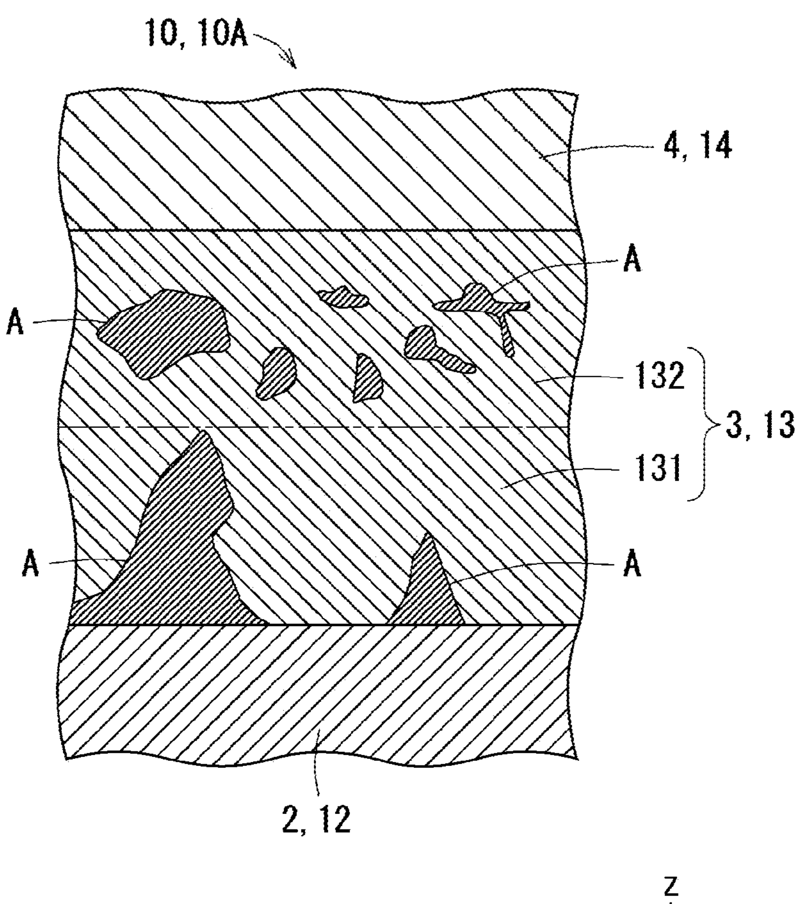
FIG. 6 is a diagram for explaining the distribution of aggregated sintered bodies in the underlying electrode.
Figure 6:
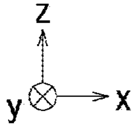
Figure 7:
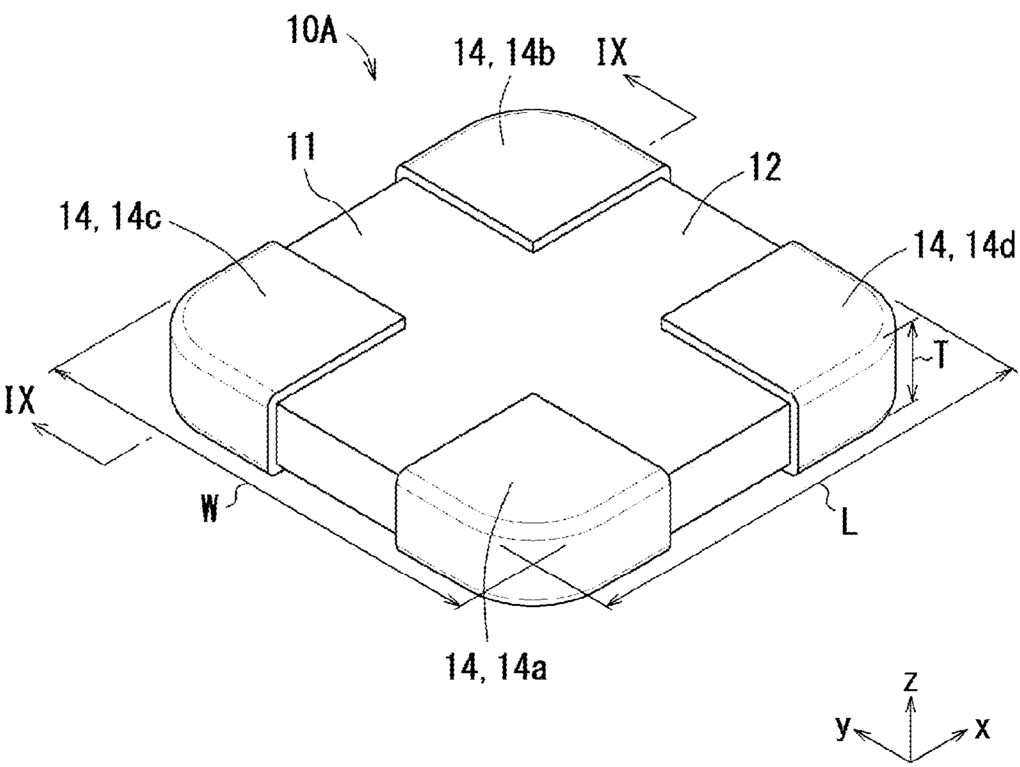
FIG. 7 is a perspective view of a multilayer ceramic capacitor of a second embodiment.
Figure 8:
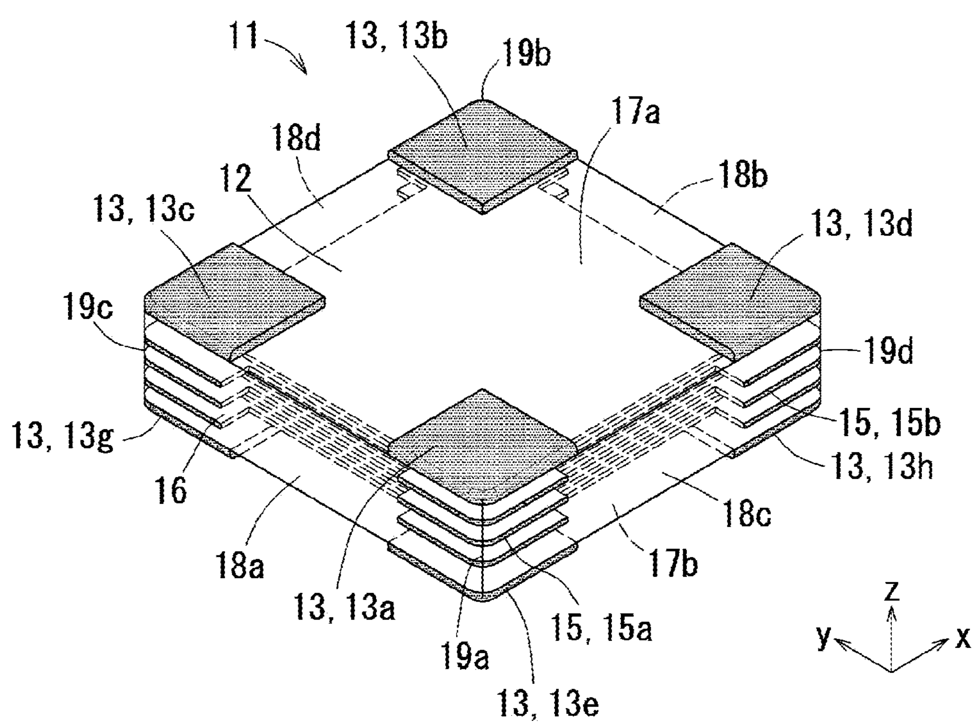
FIG. 8 is a perspective view of a base component of the multilayer ceramic capacitor in FIG. 7.
Figure 9:
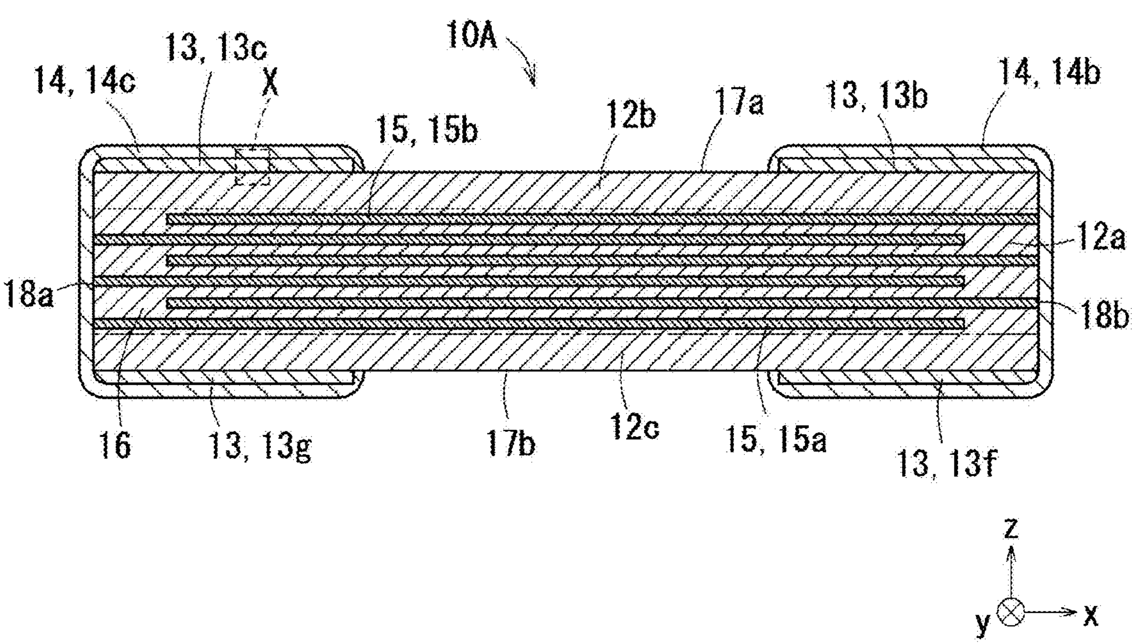
FIG. 9 is a cross-sectional view taken along cross-section line IX-IX in FIG. 7.
Figure 10:
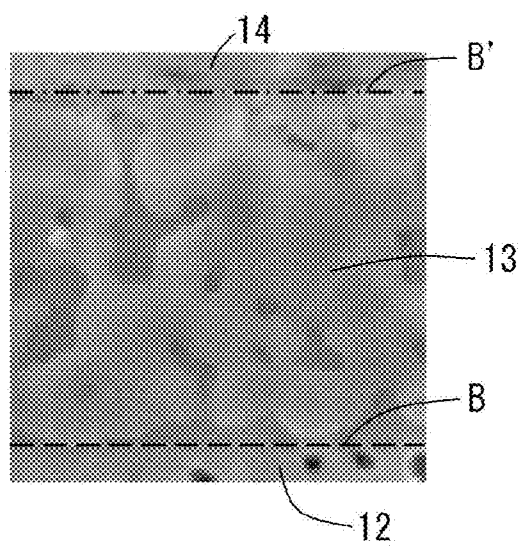
FIG. 10 is a diagram illustrating an example of an electronic microscope image of a cross section of an underlying electrode.
Figure 11:
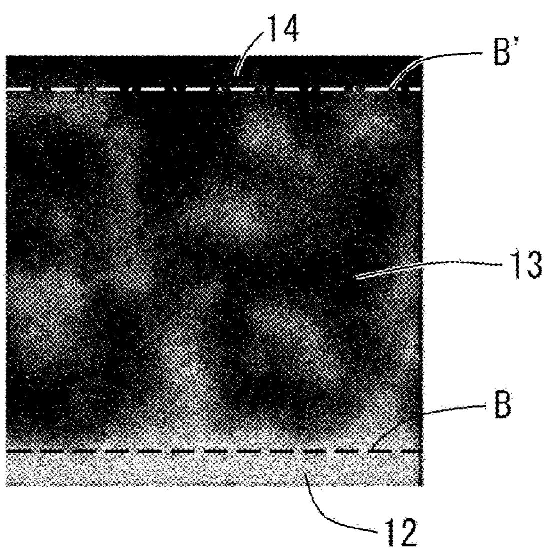
FIG. 11 is a diagram illustrating an example of an elemental mapping image showing the distribution of the Ba element in the cross section of the underlying electrode.
Figure 12:
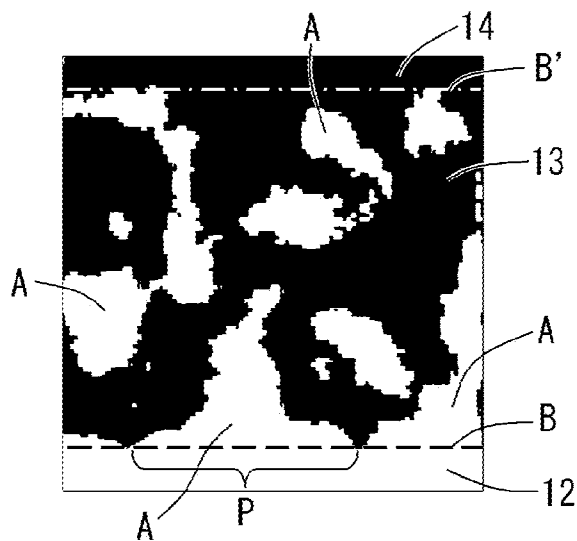
FIG. 12 is a diagram illustrating an example of a binarized elemental mapping image obtained by binarizing the elemental mapping image of FIG. 11.

FIG. 1 is a perspective view of a multilayer ceramic capacitor of a first embodiment, FIG. 2 is a perspective view of a base component of the multilayer ceramic capacitor in FIG. 1, and FIG. 3 is a cross-sectional view taken along cross-section line III-III in FIG. 1. FIG. 4 is an enlarged cross-sectional view of an important part of the multilayer ceramic capacitor in FIG. 3, FIG. 5 is a diagram for explaining the configuration of the interface between an underlying electrode and a multilayer body, and FIG. 6 is a diagram for explaining the distribution of aggregated sintered bodies in the underlying electrode. FIG. 7 is a perspective view of a multilayer ceramic capacitor of a second embodiment, FIG. 8 is a perspective view of a base component of the multilayer ceramic capacitor in FIG. 7, and FIG. 9 is a cross-sectional view taken along cross-section line IX-IX in FIG. 7. FIG. 10 is a diagram illustrating an example of an electronic microscope image of a cross section of an underlying electrode, FIG. 11 is a diagram illustrating an example of an elemental mapping image showing the distribution of the Ba element in the cross section of the underlying electrode, and FIG. 12 is a diagram illustrating an example of a binarized elemental mapping image obtained by binarizing the elemental mapping image of FIG. 11. Note that in FIGS. 2 and 8, underlying electrodes and the end portions of inner electrodes exposed on surfaces of the multilayer body are hatched to makes it easy to understand the illustration. Although FIGS. 4 to 6 are diagrams for explaining the multilayer ceramic capacitor of the first embodiment, they also explain the multilayer ceramic capacitor of the second embodiment. In FIG. 5, in a cross-sectional view of an underlying electrode, the illustration of aggregated sintered bodies not located on the interface between the underlying electrode and the multilayer body is omitted to makes it easy to understand the illustration.

The multilayer ceramic capacitor 10 according to the first embodiment includes a base component 1 and multiple outer electrodes 4 as illustrated in FIG. 1. As illustrated in FIG. 2, the base component 1 includes a multilayer body 2 and multiple underlying electrodes 3. The multilayer ceramic capacitor 10 may be a thin multilayer ceramic capacitor. In the multilayer ceramic capacitor 10, for example, the dimension T in the height direction (the z-axis direction) may be smaller than the dimension L in the longitudinal direction (the x-axis direction) and the dimension W in the width direction (the y-axis direction).

The multilayer body 2 includes multiple inner electrodes 5 and multiple dielectric layers 6 alternately stacked. As illustrated in FIG. 2, the multilayer body 2 may have an approximately rectangular parallelepiped shape. The multilayer body 2 includes a first surface 7*a* and a second surface 7*b* opposed to each other in the stacking direction of the multiple inner electrodes 5 and the multiple dielectric layers 6 (the z-axis direction). The multilayer body 2 includes a first end surface 8*a* and a second end surface 8*b* opposed to each other in the longitudinal direction (the x-axis direction) orthogonal to the stacking direction and also includes a first side surface 9*a* and a second side surface 9*b* opposed to each other in the width direction (the y-axis direction) orthogonal to the stacking direction and the longitudinal direction. Hereinafter, the first surface 7*a* and the second surface 7*b* are sometimes collectively referred to as the main surfaces 7*a* and 7*b*, the first end surface 8*a* and the second end surface 8*b* are sometimes collectively referred to as the end surfaces 8*a* and 8*b*, and the first side surface 9*a* and the second side surface 9*b* are sometimes collectively referred to as the side surfaces 9*a* and 9*b*. The main surfaces 7*a* and 7*b* may be perpendicular to the stacking direction. The end surfaces 8*a* and 8*b* may be perpendicular to the longitudinal direction. The side surfaces 9*a* and 9*b* may be perpendicular to the width direction.

The dielectric layers 6 are composed of, for example, a ceramic material containing $BaTiO_3$ (barium titanate), $CaTiO_3$ (calcium titanate), $SrTiO_3$ (strontium titanate), $BaZrO_3$ (barium zirconate), or $CaZrO_3$ (calcium zirconate) as a major component. The ceramic material may contain a glass component. The glass component may be, for example, an $SiO_2$ (silicon oxide)-BaO (barium oxide)-CaO (calcium oxide)-based glass component. Each dielectric layer 6 may have a thickness of, for example, approximately 0.1 to 1 μm.

As illustrated in FIGS. 2 and 3, the multiple inner electrodes 5 include multiple first inner electrodes 5*a* and multiple second inner electrodes 5*b*. Each first inner electrode 5*a* has an end portion exposed on the first end surface 8*a*. Each second inner electrode 5*b* has an end portion exposed on the second end surface 8*b*. The first inner electrodes 5*a* and the second inner electrodes 5*b* have different polarities. In other words, when the first inner electrodes 5*a* have a first polarity, the second inner electrode 5*b* have a second polarity different from the first polarity.

The inner electrodes 5 are composed of, for example, a conductive material containing Ni (nickel), Cu (copper), Sn (tin), or the like as a major component. The conductive material may contain, for example, a ceramic material such as $BaTiO_3$, $CaTiO_3$, $SrTiO_3$, $BaZrO_3$, or $CaZrO_3$. Each inner electrode 5 may have a thickness of, for example, approximately 0.1 to 1 μm.

As illustrated in FIG. 3, the multilayer body 2 may include a capacitive portion 2*a* and cover portions 2*b* and 2*c*. The capacitive portion 2*a* includes the multiple inner electrodes 5 and the multiple dielectric layers 6 alternately stacked and has capacitance. The cover portions 2*b* and 2*c* are located at both ends of the capacitive portion 2*a* in the stacking direction. Each of the cover portions 2*b* and 2*c* is composed of one or more dielectric layers and need not have capacitance.

Although not illustrated, each of the cover portions 2*b* and 2*c* may be composed of two or more dielectric layers and one or more (less than the number of dielectric layers) dummy layers located between the dielectric layers. Each dummy layer may include multiple dummy electrodes. The multiple dummy electrodes in each dummy layer may overlap the multiple underlying electrodes 3 in transparent plan view. In other words, the number of multiple dummy electrodes may be the same as or different from the number of multiple underlying electrodes 3. The positions of the multiple dummy electrodes may be approximately the same as or different from those of the multiple underlying electrodes 3. The multiple dummy electrodes and the multiple underlying electrodes 3 may have approximately the same shapes (including the dimensions) or different shapes (including the dimensions). The multiple dummy electrodes may be exposed to the outside from one or more of the end surfaces 8*a* and 8*b* and the side surfaces 9*a* and 9*b* of the multilayer body 2. The multiple outer electrodes 4 may be connected to the exposed portions. The multiple dummy electrodes need not have capacitance. The material (components) and the microstructure of the multiple dummy electrodes may be the same as those of the underlying electrodes 3, may be the same as those of the inner electrodes 5, or may be different from any of those. Note that in some cases, the presence of the dummy layers is ignored, and the cover portions 2*b* and 2*c* are described as if each of them were composed of only a dielectric layer, for convenience.

The cover portions 2*b* and 2*c* (their dielectric layers) are composed of, for example, a ceramic material containing $BaTiO_3$, $CaTiO_3$, $SrTiO_3$, $BaZrO_3$, $CaZrO_3$, or the like as a major component. The ceramic material may contain a glass component. The glass component may be, for example, an $SiO_2$—BaO—CaO-based glass component. The cover portions 2*b* and 2*c* may be composed of the same ceramic material as the dielectric layers 6.

The multiple underlying electrodes 3 include a first underlying electrode 3*a* and a second underlying electrode 3*b*. The first underlying electrode 3*a* is located on the first surface 7*a* and close to the first end surface 8*a*. The second underlying electrode 3*b* is located on the first surface 7*a* and close to the second end surface 8*b*. The multiple underlying electrodes 3 are not present on the end surfaces 8*a* and 8*b*. In other words, the multiple underlying electrodes 3 are not directly joined to the multiple inner electrodes 5. The multiple underlying electrodes 3 may be electrically connected to the corresponding ones of the multiple inner electrodes 5.

The first underlying electrode 3*a* and the second underlying electrode 3*b* are apart from each other as illustrated in FIGS. 2 and 3. The first underlying electrode 3*a* and the second underlying electrode 3*b* may be approximately rectangular. The dimension of the first underlying electrode 3*a* in the longitudinal direction (the x-axis direction) may be approximately 10 to 30% of the dimension of the multilayer body 2 in the longitudinal direction. The second underlying electrode 3*b* also has the same or a similar configuration. The end edge of the first underlying electrode 3*a* on the first end surface 8*a* side may be approximately aligned with the end edge of the first surface 7*a* on the first end surface 8*a* side in plan view. The end edge of the second underlying electrode 3*b* on the second end surface 8*b* side may be approximately aligned with the end edge of the first surface 7*a* on the second end surface 8*b* side in plan view.

The underlying electrodes 3 are composed of, for example, a conductive material containing Ni, Cu, Sn, or the like as a major component. The conductive material may contain, for example, a ceramic material such as $BaTiO_3$, $CaTiO_3$, $SrTiO_3$, $BaZrO_3$, or $CaZrO_3$. This makes it easy to increase the degree of adhesion between the underlying electrodes 3 and the multilayer body 2. The ceramic material may contain Si (silicon), Mg (magnesium), Mn (manganese), or the like as an sintering aid. Each underlying electrode 3 may be thicker than one inner electrode 5. Each underlying electrode 3 may have a thickness of, for example, approximately 1 to 5 μm.

The underlying electrodes 3 may include a third underlying electrode 3*c* and a fourth underlying electrode 3*d*. The third underlying electrode 3*c* is located on the second surface 7*b* and close to the first end surface 8*a*. The fourth underlying electrode 3*d* is located on the second surface 7*b* and close to the second end surface 8*b*. The third underlying electrode 3*c* may have the same or a similar configuration as the first underlying electrode 3*a* except that it is located on the second surface 7*b*. The fourth underlying electrode 3*d* may have the same or a similar configuration as the second underlying electrode 3*b* except that it is located on the second surface 7*b*.

As illustrated in FIGS. 1 and 3, the multiple outer electrodes 4 include a first outer electrode 4*a* and a second outer electrode 4*b*.

The first outer electrode 4*a* extends from the first end surface 8*a* at least onto the first surface 7*a* and is connected to the multiple first inner electrodes 5*a* and the first underlying electrode 3*a*. The first outer electrode 4*a* may cover the first underlying electrode 3*a*.

The first outer electrode 4*a* may extend from the first end surface 8*a* onto the first surface 7*a* and the second surface 7*b* and be connected to the multiple first inner electrodes 5*a*, the first underlying electrode 3*a*, and the third underlying electrode 3*c*. The first outer electrode 4*a* may cover the first underlying electrode 3*a* and the third underlying electrode 3*c*. The first outer electrode 4*a* may extend from the first end surface 8*a* onto the first surface 7*a*, the second surface 7*b*, the first side surface 9*a*, and the second side surface 9*b*.

The second outer electrode 4*b* extends from the second end surface 8*b* at least onto the first surface 7*a* and is connected to the multiple second inner electrodes 5*b* and the second underlying electrode 3*b*. The second outer electrode 4*b* may cover the second underlying electrode 3*b*.

The second outer electrode 4*b* may extend from the second end surface 8*b* onto the first surface 7*a* and the second surface 7*b* and be connected to the multiple second inner electrodes 5*b*, the second underlying electrode 3*b*, and the fourth underlying electrode 3*d*. The second outer electrode 4*b* may cover the second underlying electrode 3*b* and the fourth underlying electrode 3*d*. The second outer electrode 4*b* may extend from the second end surface 8*b* onto the first surface 7*a*, the second surface 7*b*, the first side surface 9*a*, and the second side surface 9*b*.

Each outer electrode 4 may be a plating layer. In this case, the thickness of the outer electrode 4 can be reduced. This configuration enables the multilayer ceramic capacitor 10 to be downsized without reducing the capacitance of the multilayer ceramic capacitor 10. The thickness of the outer electrode 4 may be, for example, approximately 5 to 20 μm. The outer electrodes 4 may be formed by, for example, a plating method such as an electroless plating method or an electroplating method. The outer electrodes 4 may be composed of a conductive material containing Cu, Ni, Sn, or the like as a major component.

As illustrated in FIG. 3, each outer electrode 4 may be composed of a single plating layer. Each outer electrode 4 may be composed of multiple plating layers. For example, each outer electrode 4 may be composed of a first plating layer connected to the corresponding underlying electrodes 3 and inner electrodes 5, and a second plating layer covering the first plating layer, or may be composed of a first plating layer connected to the corresponding underlying electrodes 3 and inner electrodes 5, a second plating layer covering the first plating layer, and a third plating layer covering the second plating layer. Each outer electrode 4 may further includes a plating layer covering the third plating layer.

As illustrated in FIG. 4, in the multilayer ceramic capacitor 10 of the present embodiment, the underlying electrode 3 contains multiple aggregated sintered bodies A composed of dielectric particles. Each aggregated sintered body A is formed by dielectric particles in the conductive metal aggregating while being sintered during a sintering process. Each aggregated sintered body A may be a sintered body which is a continuous body formed by dielectric particles in the conductive metal aggregating during a sintering process. Each aggregated sintered body A may be a sintered body formed by dielectric particles aggregating while being sintered in a state of partially retaining the shapes of primary particles. The aggregated sintered bodies A are an example of sintered bodies contained in the underlying electrodes 3. Unlike the description of the embodiment, the sintered bodies contained in the underlying electrodes 3 are not limited to aggregated sintered bodies A. A configuration in which whether the sintered bodies are aggregated sintered bodies A or not cannot be determined is also possible. The dielectric particles may be ceramic particles of a ceramic material partially composing the underlying electrodes 3.

As illustrated in FIG. 4, at least part of the multiple aggregated sintered bodies A (hereinafter also referred to as interface aggregated sintered bodies) are located on the interface B between the underlying electrode 3 and the multilayer body 2. Each interface aggregated sintered body is formed by aggregation so as to include one of multiple portions P of the interface B between the underlying electrode 3 and the multilayer body 2. A portion of the interface aggregated sintered body is located at a portion P and bridged to the multilayer body 2, in other words, a ceramic sintered body composing the multilayer body 2. FIG. 4 also illustrates aggregated sintered bodies A not located on the interface B, and part of such aggregated sintered bodies A (interface aggregated sintered bodies) form networks, part of which are located on the interface B.

At least part of multiple aggregated sintered bodies A in a cross section as illustrated in FIG. 4 are three-dimensionally connected and form networks, and the size and the like of the networks are not particularly limited. For example, one network may extend throughout the entire part of the underlying electrode 3, or multiple networks may be distributed in the underlying electrode 3. The maximum length, in the z-axis direction, of at least one network of one or more networks may be 50% or more, 80% or more, or 100% of the thickness of the underlying electrodes 3. In addition or alternatively, the maximum length of the one network mentioned above in the x-axis direction may be 10% or more, 30% or more, 50% or more, 80% or more, or 100% of the length of the underlying electrode 3 in the x-axis direction (the same or similar explanation is applied to the y-axis direction).

The ceramic particles in the underlying electrode 3 before firing are uniformly dispersed in the conductive metal. However, sintering accompanied by melting of the conductive metal first proceeds during firing, and hence, the ceramic particles are pushed aside due to the uneven distribution of the centers of melting and are distributed unevenly. When the temperature becomes close to the firing temperature of the effective layers, the dielectric ceramic of the effective layers containing an sintering aid starts to be sintered and becomes a ceramic body with a unitary structure. However, sintering as in the effective layers does not proceed in the dielectric ceramic particles in the underlying electrodes 3 containing almost no or only a trace amount of sintering aid. Partial sintering starts from the contact points between aggregated particles, but the aggregated particles cannot completely become sintered bodies, and the dielectric ceramic particles retain the shapes of primary particles (material powder) after firing. In other words, if the underlying electrodes 3 contain an sintering aid for dielectric ceramic particles at a certain ratio, sintering proceeds, and the dielectric ceramic particles do not retain the shapes of primary particles (material powder). In that case, the effect of the present disclosure of firmly joining the underlying electrodes 3 to the ceramic multilayer body with the intervention of aggregated sintered bodies A cannot be obtained. For example, the ratio of the amount of sintering aid to the amount of dielectric ceramic in the underlying electrodes 3 may be zero or one tenth or less of the mixing ratio in the effective layers or may be one fifth or less.

In addition, dielectric ceramic particles having smaller diameters may be used for the underlying electrodes 3 to increase the surface energy of the particles so that the surfaces of the particles are joined by sintering. For example, the diameters of dielectric ceramic particles contained in the underlying electrodes 3 may be smaller than the particle diameters of ceramic particles in the effective layers. For example, the diameters of the dielectric ceramic particles contained the underlying electrodes 3 may be one third or less of the particle diameters of the ceramic particles in the effective layers.

Since the underlying electrode 3 and the multilayer body 2 are bridged with the intervention of multiple portions P (interface aggregated sintered bodies) in the multilayer ceramic capacitor 10, the adhesion between the underlying electrode 3 and the multilayer body 2 can be high. This makes the separation between the underlying electrode 3 and the multilayer body 2 less likely to occur, mitigating the decrease in the reliability and electrical characteristics of the multilayer ceramic capacitor 10.

In a cross-sectional view of the multilayer ceramic capacitor 10 in the stacking direction, the ratio of the length of the multiple portions P to the length of the interface B may be 15% or more. In other words, as illustrated in FIG. 5, given that XB is the length of the interface B in the multilayer ceramic capacitor 10, and that X1, X2, . . . , Xn are the lengths of the multiple (for example, n) portions P, the ratio of the sum of the lengths of the multiple portions P to the length XB of the interface B (hereinafter also referred to as "the length ratio $R_P$") may be 15% or more. Specifically, the multiple portions P may satisfy the inequation X1+X2+ . . . +Xn≥0.15×XB. In this case, the ratio of the area of the multiple portions P to the area of the interface B is high, and hence, the adhesion between the underlying electrode 3 and the multilayer body 2 is even higher. This makes the separation between the underlying electrode 3 and the multilayer body 2 even less likely to occur, further mitigating the decrease in the reliability and electrical characteristics of the multilayer ceramic capacitor 10. Although FIG. 5 illustrates an example in which a cross section in the stacking direction is a zx section which is parallel to the stacking direction and the longitudinal direction, the present disclosure is not limited to this example. A cross section in the stacking direction may be a yz section which is parallel to the stacking direction and the width direction or may be other cross sections.

In a cross-sectional view of the multilayer ceramic capacitor 10 in the stacking direction, the ratio of the area of the multiple aggregated sintered bodies A to the cross-sectional area of the underlying electrode 3 may be 21% or more and 44% or less. When the ratio of the area of the multiple aggregated sintered bodies A to the cross-sectional area of the underlying electrode 3 (hereinafter also referred to as "the area ratio $R_A$") is 21% or more, the separation between the underlying electrode 3 and the multilayer body 2 is less likely to occur. When the area ratio $R_A$ is 44% or less, the conductivity of the underlying electrode 3 can be high, and this in turn makes it easy to form the outer electrode 4 which is a plating layer. This mitigates the decrease in the reliability and electrical characteristics of the thin multilayer ceramic capacitor 10.

The area ratio $R_A$ can be measured by performing a quantitative analysis based on wavelength-dispersive X-ray spectroscopy (WDX) on a cross section of the underlying electrode 3. The area ratio $R_A$ may be an area ratio measured by analyzing the entire region of a cross section of the underlying electrode 3 or may be the average value of multiple area ratios measured by analyzing multiple partial regions in a cross section of the underlying electrode 3. The number of multiple partial regions may be, for example, five or more.

Regarding the direction orthogonal to a cross section of the underlying electrode 3, the area ratio $R_A$ may be a value of one cross section at a specific position (for example, a typical position such as the center position) of the underlying electrode 3 or may be the average value of multiple (for example, 3 or more or 5 or more) cross sections obtained by dividing the underlying electrode 3 into equal parts. For the latter case, if it is difficult to divide one underlying electrode 3 into equal parts, multiple multilayer ceramic capacitors 10 intended to have the same configuration may be used. Multiple cross sections may be measured by using the multiple multilayer ceramic capacitors 10 so as to correspond to the multiple cross sections obtained by the equal division mentioned above, and the average value of the measurement results of the multiple sections may be calculated. Note that the same or similar explanation can be applied to other characteristics or indicator values in that the cross section at a specific position can be measured, or that multiple sections can be measured, and the average value of the measurement results can be used, as mentioned above.

As illustrated in FIG. 4, in a cross-sectional view of the underlying electrode 3 in the stacking direction, the interface aggregated sintered bodies may be in the form of protrusions extending from the portions P. In this case, it is easy to make the length ratio $R_P$ 15% or more and also make the area ratio $R_A$ 21% or more and 44% or less. Note that being in the form of a protrusion means a shape in which the lower side (the portion P side) close to the multilayer body 2 is wider, and the upper side (the outer electrode 4 side) away from the multilayer body 2 is narrower. The interface aggregated sintered body in a cross-sectional view in the stacking direction may have a shape in which the width in the direction along the interface B gradually decreases as it extends in a direction away from the multilayer body 2, as with an approximately triangular shape having one side at a portion P. Having an approximately triangular shape makes the underlying electrode 3 firmly fixed to the surface of the ceramic element body. The interface aggregated sintered bodies in a cross-sectional view in the stacking direction may also have non-uniform shapes such as shapes in which the peripheral edges excluding the portion P have irregular jagged shapes or saw-like shapes. The height of the interface aggregated sintered bodies from the interface B may be, for example, 2 μm or less.

The underlying electrodes 3 are not limited to ones substantially containing a glass component. Not substantially containing a glass component means not intentionally adding a glass component. Although details will be described later, a method of manufacturing the multilayer ceramic capacitor 10 includes firing a base component 1 precursor that will become the base component 1. The base component 1 precursor includes a multilayer body 2 precursor that will become a multilayer body 2 and underlying electrode 3 precursors that will become underlying electrodes 3. The multilayer body 2 precursor is composed of conductivity paste and ceramic green sheets. The underlying electrode 3 precursor is composed of conductivity paste, and the conductivity paste contains a ceramic material that will become aggregated sintered bodies A. Underlying electrodes 3 substantially not containing a glass component can be formed by using the underlying electrode 3 precursors not containing a glass component. The ceramic material that will become aggregated sintered bodies A may be a material that is the same as the major component for the base component 1 but the particle diameter of which is smaller than the major component for the base component 1. When the ceramic material that will become aggregated sintered bodies A is a material that is the same as the major component for the base component but the particle diameter of which is smaller than that, the ceramic material contained in the underlying electrode 3 precursor is likely to aggregate and be sintered in a solid phase when the base component 1 precursor is fired, and aggregated sintered bodies A having non-uniform shapes are more likely to be formed even if the underlying electrode 3 precursor does not contain a glass component.

The ceramic green sheets composing the multilayer body 2 precursor may contain a glass component. In this case, when the base component 1 precursor is fired, part of the glass component contained in the ceramic green sheets flows into the underlying electrode 3 precursor, and this promotes the aggregation of the ceramic material in regions close to the interface between the underlying electrode 3 precursor and the multilayer body 2 precursor. Hence, it is more likely that aggregated sintered bodies A in the form of protrusions in which the lower side close to the multilayer body 2 is wider, and the upper side away from the multilayer body 2 is narrower are formed. When a material to which a glass component is intentionally not added is used for the underlying electrode 3 precursor, the aggregation and sintering of the ceramic material are less likely to occur at portions other than regions close to the interface with the multilayer body 2 precursor, so that protrusions having approximately triangular shapes mentioned above are more likely to be formed.

As illustrated in FIG. 6, when it is assumed that a cross section of the underlying electrode 3 in the stacking direction is divided in the stacking direction into a first region 131 close to the multilayer body 2 and a second region 132 away from the multilayer body 2, the multilayer ceramic capacitor 10 may have a configuration in which a larger number of multiple aggregated sintered bodies A (multiple aggregated sintered bodies A that appear in the cross section) are present in the second region 132 than in the first region 131. In this case, it is easy to make the length ratio $R_P$ 15% or more and make the overall average area ratio $R_A$ 21% or more and 44% or less. The first region 131 and the second region 132 may be the regions into which the underlying electrode 3 is equally divided in the stacking direction. The aggregated sintered bodies A extending over the first region 131 and the second region 132 may be judged to belong to the region where more than 50% of their area is positioned. When the number of aggregated sintered bodies A is larger in the second region 132 than in the first region 131, the total area of the aggregated sintered bodies A may be larger in the first region 131 than the second region 132 or may be larger in the second region 132 than in the first region 131.

A multilayer ceramic capacitor according to a second embodiment of the present disclosure will be described. As illustrated in FIG. 7, a multilayer ceramic capacitor 10A of the present embodiment includes a base component 11 and multiple outer electrodes 14. As illustrated in FIG. 8, the base component 11 includes a multilayer body 12 and multiple underlying electrodes 13. The multilayer ceramic capacitor 10A may be a thin multilayer ceramic capacitor. In the multilayer ceramic capacitor 10A, for example, the dimension T in the height direction (the z-axis direction) may be smaller than the dimension L in the longitudinal direction (the x-axis direction) and the dimension W in the width direction (the y-axis direction).

The multilayer body 12 includes multiple inner electrodes 15 and multiple dielectric layers 16 alternately stacked. As illustrated in FIG. 8, the multilayer body 12 may have an approximately rectangular parallelepiped shape. The multilayer body 12 includes a first surface 17*a* and a second surface 17*b* opposed to each other in the stacking direction of the multiple inner electrodes 15 and the multiple dielectric layers 16 (the z-axis direction). The multilayer body 12 includes a first side surface 18*a* and a second side surface 18*b* opposed to each other in the longitudinal direction (the x-axis direction) orthogonal to the stacking direction and also includes a third side surface 18*c* and a fourth side surface 18*d* opposed to each other in the width direction (the y-axis direction) orthogonal to the stacking direction and the longitudinal direction. In the following, the first surface 17*a* and the second surface 17*b* are sometimes collectively referred to as the main surfaces 17*a* and 17*b*, and the first side surface 18*a*, the second side surface 18*b*, the third side surface 18*c*, and the fourth side surface 18*d* are sometimes collectively referred to as the side surfaces 18*a* to 18*d*. The main surfaces 17*a* and 17*b* may be perpendicular to the stacking direction. The first side surface 18*a* and the second side surface 18*b* may be perpendicular to the longitudinal direction. The third side surface 18*c* and the fourth side surface 18*d* may be perpendicular to the width direction.

As illustrated in FIG. 8, the multilayer body 12 includes a first corner portion 19*a* extending over the first side surface 18*a* and the third side surface 18*c*, a second corner portion 19*b* extending over the second side surface 18*b* and the fourth side surface 18*d*, a third corner portion 19*c* extending over the first side surface 18*a* and the fourth side surface 18*d*, and a fourth corner portion 19*d* extending over the second side surface 18*b* and the third side surface 18*c*. In the following, the first corner portion 19*a*, the second corner portion 19*b*, the third corner portion 19*c*, and the fourth corner portion 19*d* are sometimes collectively referred to as the corner portions 19*a* to 19*d*.

The dielectric layers 16 are composed of, for example, a ceramic material containing $BaTiO_3$, $CaTiO_3$, $SrTiO_3$, $BaZrO_3$, $CaZrO_3$, or the like as a major component. The ceramic material may contain a glass component. The glass component may be, for example, an $SiO_2$—BaO—CaO-based glass component. Each dielectric layer 16 may have a thickness of, for example, approximately 0.1 to 1 μm.

As illustrated in FIGS. 8 and 9, the multiple inner electrodes 15 include multiple first inner electrodes 15*a* and multiple second inner electrodes 15*b*. Each first inner electrode 15*a* has end portions exposed at the first corner portion 19*a* and the second corner portion 19*b*. Each second inner electrode 15*b* has end portions exposed at the third corner portion 19*c* and the fourth corner portion 19*d*. The first inner electrodes 15*a* and the second inner electrodes 15*b* have different polarities. In other words, when the first inner electrodes 15*a* have a first polarity, the second inner electrodes 15*b* have a second polarity different from the first polarity.

The inner electrodes 15 are composed of, for example, a metal material containing Ni, Cu, Sn, or the like as a major component. The inner electrodes 15 may contain, for example, a ceramic material such as $BaTiO_3$, $CaTiO_3$, $SrTiO_3$, $BaZrO_3$, or $CaZrO_3$. Each inner electrode 15 may have a thickness of, for example, approximately 0.1 to 1 μm.

As illustrated in FIG. 9, the multilayer body 12 may include a capacitive portion 12*a* and cover portions 12*b* and 12*c*. The capacitive portion 12*a* includes the multiple inner electrodes 15 and the multiple dielectric layers 16 alternately stacked and has capacitance. The cover portions 12*b* and 12*c* are located at both ends of the capacitive portion 12*a* in the stacking direction. Each of the cover portions 12*b* and 12*c* is composed of one or more dielectric layers and need not have capacitance.

The cover portions 12*b* and 12*c* (their dielectric layers) are composed of, for example, a ceramic material containing $BaTiO_3$, $CaTiO_3$, $SrTiO_3$, $BaZrO_3$, $CaZrO_3$, or the like as a major component. The ceramic material may contain a glass component. The glass component may be, for example, an $SiO_2$—BaO—CaO-based glass component. The cover portions 12*b* and 12*c* may be composed of the same ceramic material as the dielectric layers 16.

The multiple underlying electrodes 13 include a first underlying electrode 13*a*, a second underlying electrode 13*b*, a third underlying electrode 13*c*, and a fourth underlying electrode 13*d*.

The first underlying electrode 13*a* is located on the first surface 17*a* and close to the first corner portion 19*a*. In plan view, the first underlying electrode 13*a* may be approximately rectangular. In plan view, the corner portion of the first underlying electrode 13*a* close to the first corner portion 19*a* may overlap the first corner portion 19*a*.

The second underlying electrode 13*b* is located on the first surface 17*a* and close to the second corner portion 19*b*. In plan view, the second underlying electrode 13*b* may be approximately rectangular. In plan view, the corner portion of the second underlying electrode 13*b* close to the second corner portion 19*b* may overlap the second corner portion 19*b*.

The third underlying electrode 13*c* is located on the first surface 17*a* and close to the third corner portion 19*c*. In plan view, the third underlying electrode 13*c* may be approximately rectangular. In plan view, the corner portion of the third underlying electrode 13*c* close to the third corner portion 19*c* may overlap the third corner portion 19*c*.

The fourth underlying electrode 13*d* is located on the first surface 17*a* and close to the fourth corner portion 19*d*. In plan view, the fourth underlying electrode 13*d* may be approximately rectangular. In plan view, the corner portion of the fourth underlying electrode 13*d* close to the fourth corner portion 19*d* may overlap the fourth corner portion 19*d*.

The shape of the first underlying electrode 13*a* is not limited to approximately rectangular shapes and may be approximately a sector shape (approximately a quadrant) or approximately a right triangle. In plan view of the first underlying electrode 13*a*, the center of an approximately sector shape (approximately a quadrant) may overlap the first corner portion 19*a*, or the right-angled vertex of an approximately right triangle may overlap the first corner portion 19*a*. The same or similar explanation can be applied to the second underlying electrode 13*b*, the third underlying electrode 13*c*, and the fourth underlying electrode 13*d*.

The underlying electrodes 13 are composed of, for example, a conductive material containing Ni, Cu, Sn, or the like as a major component. The conductive material may contain, for example, a ceramic material such as $BaTiO_3$, $CaTiO_3$, $SrTiO_3$, $BaZrO_3$, or $CaZrO_3$. This makes it easy to increase the degree of adhesion between the underlying electrodes 13 and the multilayer body 12. The ceramic material may contain Si, Mg, Mn, or the like. Each underlying electrode 13 may be thicker than one inner electrode 15. Each underlying electrode 13 may have a thickness of, for example, approximately 1 to 5 μm.

The underlying electrodes 13 may include a fifth underlying electrode 13*e*, a sixth underlying electrode 13*f*, a seventh underlying electrode 13*g*, and an eighth underlying electrode 13*h*. The fifth underlying electrode 13*e* is located on the second surface 7*b* and close to the first corner portion 19*a*. The sixth underlying electrode 13*f* is located on the second surface 7*b* and close to the second corner portion 19*b*. The seventh underlying electrode 13*g* is located on the second surface 7*b* and close to the third corner portion 19*c*. The eighth underlying electrode 13*h* is located on the second surface 7*b* and close to the fourth corner portion 19*d*. The fifth underlying electrode 13*e* and the sixth underlying electrode 13*f* may have the same or similar configurations as the first underlying electrode 13*a* and the second underlying electrode 13*b* except that they are located on the second surface 7*b*. The seventh underlying electrode 13*g* and the eighth underlying electrode 13*h* may have the same or similar configurations as the third underlying electrode 13*c* and the fourth underlying electrode 13*d* except that they are located on the second surface 7*b*. Multiple underlying electrodes 13 are not present on the side surfaces 18*a* to 18*d*. In other words, the multiple underlying electrodes 13 are not directly joined to the multiple inner electrodes 15. The multiple underlying electrodes 13 may be electrically connected to the corresponding ones of the multiple inner electrodes 15.

The multiple outer electrodes 14 include a first outer electrode 14*a*, a second outer electrode 14*b*, a third outer electrode 14*c*, and a fourth outer electrode 14*d*.

The first outer electrode 14*a* extends from the first corner portion 19*a* at least onto the first surface 17*a* and is connected to the multiple first inner electrodes 15*a* and the first underlying electrode 13*a*. The first outer electrode 14*a* may extend from the first corner portion 19*a* onto the first surface 17*a* and the second surface 17*b* and be connected to the multiple first inner electrodes 15*a*, the first underlying electrode 13*a*, and the fifth underlying electrode 13*e*.

The second outer electrode 14*b* extends from the second corner portion 19*b* at least onto the first surface 17*a* and is connected to the multiple first inner electrodes 15*a* and the second underlying electrode 13*b*. The second outer electrode 14*b* may extend from the second corner portion 19*b* onto the first surface 17*a* and the second surface 17*b* and be connected to the multiple first inner electrodes 15*a*, the second underlying electrode 13*b*, and the sixth underlying electrode 13*f*.

The third outer electrode 14*c* extends from the third corner portion 19*c* at least onto the first surface 17*a* and is connected to the multiple second inner electrodes 15*b* and the third underlying electrode 13*c*. The third outer electrode 14*c* may extend from the third corner portion 19*c* onto the first surface 17*a* and the second surface 17*b* and be connected to the multiple second inner electrodes 15*b*, the third underlying electrode 13*c*, and the seventh underlying electrode 13*g*.

The fourth outer electrode 14*d* extends from the fourth corner portion 19*d* at least onto the first surface 17*a* and is connected to the multiple second inner electrodes 15*b* and the fourth underlying electrode 13*d*. The fourth outer electrode 14*d* may extend from the fourth corner portion 19*d* onto the first surface 17*a* and the second surface 17*b* and be connected to the multiple second inner electrodes 15*b*, the fourth underlying electrode 13*d*, and the eighth underlying electrode 13*h*.

Each outer electrode 14 may be a plating layer. In this case, the thickness of the outer electrode 14 can be reduced. This configuration enables the multilayer ceramic capacitor 10A to be downsized without reducing the capacitance of the multilayer ceramic capacitor 10A. The thickness of the outer electrode 14 may be, for example, approximately 5 to 20 μm. The outer electrodes 14 may be formed by, for example, a plating method such as an electroless plating method or an electroplating method. The outer electrodes 14 may be composed of a metal material containing Cu, Ni, Sn, or the like as a major component.

As illustrated in FIG. 9, each outer electrode 14 may be composed of a single plating layer. Each outer electrode 14 may be composed of multiple plating layers. Each outer electrode 14, for example, may be composed of, a first plating layer connected to the corresponding underlying electrodes 13 and inner electrodes 15, and a second plating layer covering the first plating layer, or may be composed of a first plating layer connected to the corresponding underlying electrodes 13 and inner electrodes 15, a second plating layer covering the first plating layer, and a third plating layer covering the second plating layer.

As illustrated in FIG. 4, in the multilayer ceramic capacitor 10A of the present embodiment, the underlying electrode 13 contains multiple aggregated sintered bodies A. Each aggregated sintered body A is formed by aggregated dielectric particles. The dielectric particles may be ceramic particles of a ceramic material partially composing the underlying electrodes 13.

As illustrated in FIG. 4, at least part of the multiple aggregated sintered bodies A (hereinafter also referred to as interface aggregated sintered bodies) are located on the interface B between the underlying electrode 13 and the multilayer body 12. Each interface aggregated sintered body is formed by aggregation so as to include one of multiple portions P of the interface B between the underlying electrode 13 and the multilayer body 12. A portion of the interface aggregated sintered body is located at a portion P and bridged to the multilayer body 12, in other words, an aggregated sintered body of ceramic particles composing the multilayer body 12. FIG. 4 also illustrates aggregated sintered bodies A not located on the interface B, and part of such aggregated sintered bodies A (interface aggregated sintered bodies) form networks, part of which are located on the interface B.

Since the underlying electrode 13 and the multilayer body 12 are bridged with the intervention of multiple portions P (interface aggregated sintered bodies) in the multilayer ceramic capacitor 10A, the adhesion between the underlying electrode 13 and the multilayer body 12 can be high. This makes the separation between the underlying electrode 13 and the multilayer body 12 less likely to occur, mitigating the decrease in the reliability and electrical characteristics of the multilayer ceramic capacitor 10A.

In a cross-sectional view of the multilayer ceramic capacitor 10A in the stacking direction, the ratio of the length of the multiple portions P to the length of the interface B may be 15% or more. In other words, as illustrated in FIG. 5, given that XB is the length of the interface B in the multilayer ceramic capacitor 10A, and that X1, X2, . . . , Xn are the lengths of the multiple (for example n) portions P, the length ratio $R_P$ of the sum of the lengths of the multiple portions P to the length XB of the interface B may be 15% or more. Specifically, the multiple portions P may satisfy the inequation X1+X2+ . . . +Xn≥0.15×XB. In this case, the effects are the same as or similar to those of the first embodiment. Although FIG. 5 illustrates an example in which a cross section in the stacking direction is a zx section which is parallel to the stacking direction and the longitudinal direction, the present disclosure is not limited to this example. A cross section in the stacking direction may be a yz section which is parallel to the stacking direction and the width direction or may be other cross sections.

In a cross-sectional view of the multilayer ceramic capacitor 10A in the stacking direction, the ratio of the area of the multiple aggregated sintered bodies A to the cross-sectional area of the underlying electrode 13 may be 21% or more and 44% or less. In this case, the effects are the same as or similar to those of the first embodiment. The method of measuring the ratio of the area of the multiple aggregated sintered bodies A to the cross-sectional area of the underlying electrode 13 (the area ratio $R_A$) also is the same as or similar to that in the first embodiment.

As illustrated in FIG. 4, in a cross-sectional view of the underlying electrode 13 in the stacking direction, the interface aggregated sintered bodies may be in the form of protrusions extending from the portions P. The description of the effects of the protruding shape, the meaning of the protruding shape, and specific forms (triangular shapes, jagged shapes, a height of 2 μm, and the like), or the like in the description of the first embodiment may be applied to the second embodiment.

The underlying electrodes 13, in the same or a similar manner as the underlying electrode 3 in the first embodiment, are not limited to ones substantially containing a glass component. In the method of manufacturing the multilayer ceramic capacitor 10A, the ceramic green sheets composing the multilayer body 12 precursor may contain a glass component in the same or a similar manner as in the multilayer body 2 precursor in the first embodiment.

As illustrated in FIG. 6, when it is assumed that a cross section of the underlying electrode 13 in the stacking direction is divided in the stacking direction into a first region 131 close to the multilayer body 12 and a second region 132 away from the multilayer body 12, the multilayer ceramic capacitor 10A may have a configuration in which a larger number of multiple aggregated sintered bodies A (multiple aggregated sintered bodies A that appear in the cross section) are present in the second region 132 than in the first region 131. In this case, the effects are the same as or similar to those of the first embodiment.

Methods of measuring the area ratio $R_A$ of the aggregated sintered bodies A and the length ratio $R_P$ of the multiple portions P in the multilayer ceramic capacitor 10 or 10A will be described. Although the following description is based on an example of the multilayer ceramic capacitor 10A, the same or similar explanation can be applied also to the multilayer ceramic capacitor 10. In addition, in the following description, it is assumed that the multilayer body 12 is composed of a ceramic material containing $BaTiO_3$ as a major component, that the underlying electrodes 13 are composed of a conductive material containing Ni as a major component and also containing $BaTiO_3$, and that the outer electrodes 14 are composed of a conductive material containing Cu as a major component.

First, the multilayer ceramic capacitor 10A is ground in the longitudinal direction (the x-axis direction) to expose a cross section as illustrated in FIG. 9 (hereinafter also referred to as "the exposed cross section"). Next, an SEM-EDS (scanning electron microscope-energy dispersive analysis) device is used to capture an electronic microscope image of the exposed cross section (hereinafter also referred to as an "SEM image") and obtain an elemental mapping image (hereinafter also referred to as an "EDS image") of the exposed cross section for each element. Examples of the SEM-EDS device that can be used include JSM-IT500HR available from JEOL Ltd. To capture the SEM image, the acceleration voltage was set to 15 kV, and the magnification to 20000×. To obtain the EDS image, the resolution was set to 2048 pixels×1536 pixels.

FIG. 10 illustrates an example of an SEM image of portion X in FIG. 9, and FIG. 11 illustrates an example of an EDS image for the Ba element in portion X in FIG. 9. FIG. 12 is a binarized EDS image obtained by binarizing the EDS image of FIG. 11. The threshold for binarizing the EDS image may be set as appropriate. When the EDS image is a 256-level grayscale image, the threshold may be, for example, approximately 15 to 25 or may be approximately 20. To binarize an EDS image, commercially available image processing software may be used. Note that the dashed line in FIGS. 10 to 12 indicates the interface B between the underlying electrode 13 and the multilayer body 12, and the dashed dotted line in FIGS. 10 to 12 indicates the interface B' between the underlying electrode 13 and the outer electrode 14. The interface B can be determined from EDS images for the elements (Ba and Ti) composing the multilayer body 12 and EDS images for the elements (Ni, Ba, and Ti) composing the underlying electrode 13. The interface B' can be determined from EDS images for the elements (Ni, Ba, and Ti) composing the underlying electrode 13 and an EDS image for the element (Cu) composing the outer electrode 14. The region between the interface B and the interface B' in FIG. 12 corresponds to the cross section of the underlying electrode 13. The white regions in the cross section of the underlying electrode 13 are the regions where Ba is present, and these regions can be considered to be the region where aggregated sintered bodies A are present. The black regions in the cross section of the underlying electrode 13 are the regions where Ba is substantially not present, and these regions can be considered to be the regions where aggregated sintered bodies A are not present.

As illustrated in FIG. 12, an aggregated sintered body A that aggregated so as to include a portion P on the interface B has a protruding shape. A larger number of aggregated sintered bodies A are present in the region close to the outer electrode 14 in the underlying electrode 13 than in the region close to the multilayer body 12.

The length ratio $R_P$ can be measured by measuring the length XB of the interface B and the length of each portion P along the interface B in a binarized EDS image of the entire exposed cross section, and then dividing the sum (X1+X2+ . . . +Xn) of the lengths of the multiple portions P along the interface B by the length XB.

The area ratio $R_A$ can be measured by extracting multiple partial regions from a binarized EDS image of the entire exposed cross section, calculating, for each partial region, the ratio $r_A$ of the area of the regions where aggregated sintered bodies A are present to the area of the partial region, and calculating the average value of the ratios $r_A$ of the multiple partial regions. The number of multiple partial regions extracted from a binarized EDS image of the exposed cross section may be approximately three to ten or may be approximately five.

Figure 13:
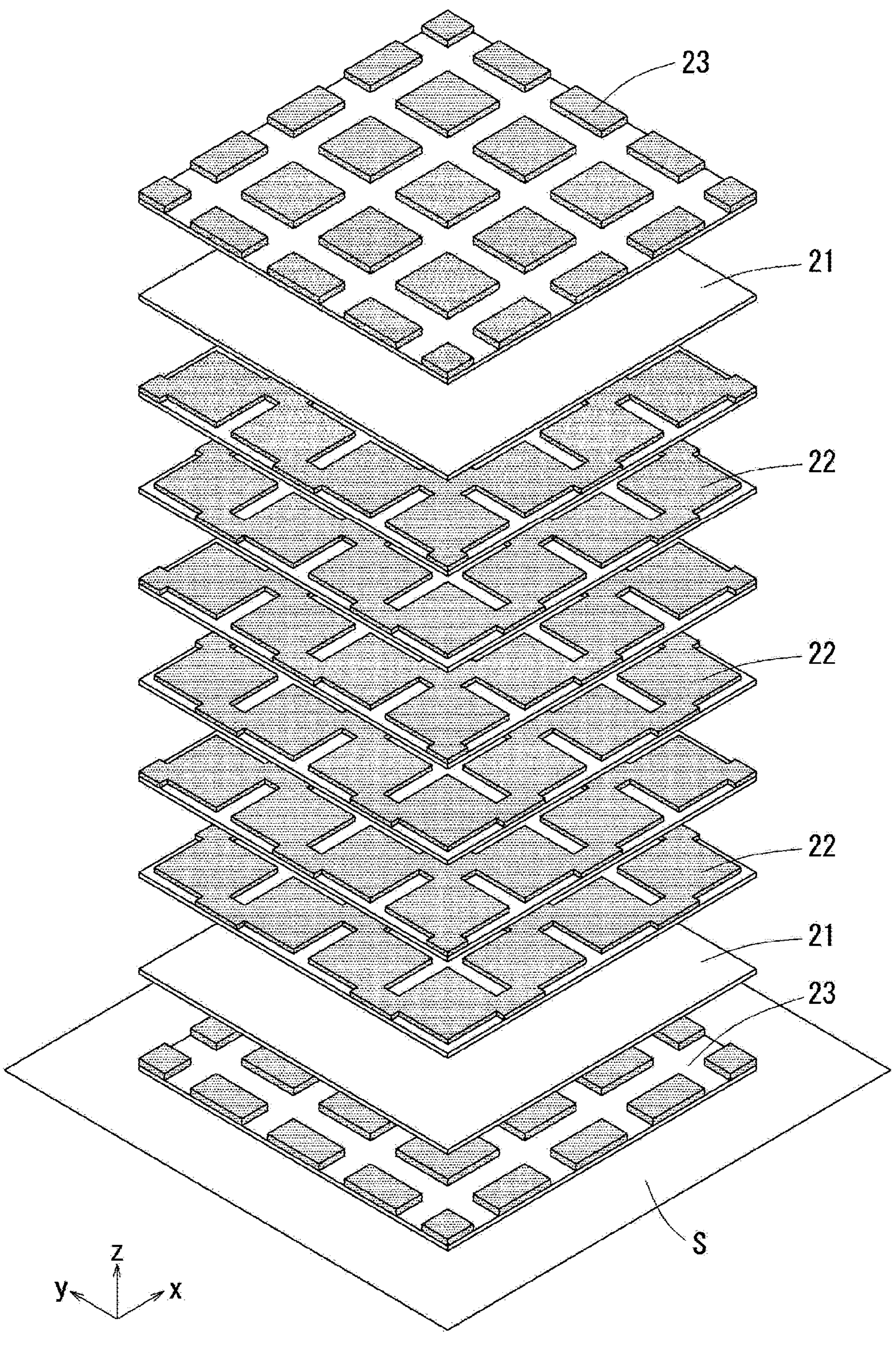
FIG. 13 is a perspective view diagram for explaining steps of producing a mother multilayer body.
Figure 14:
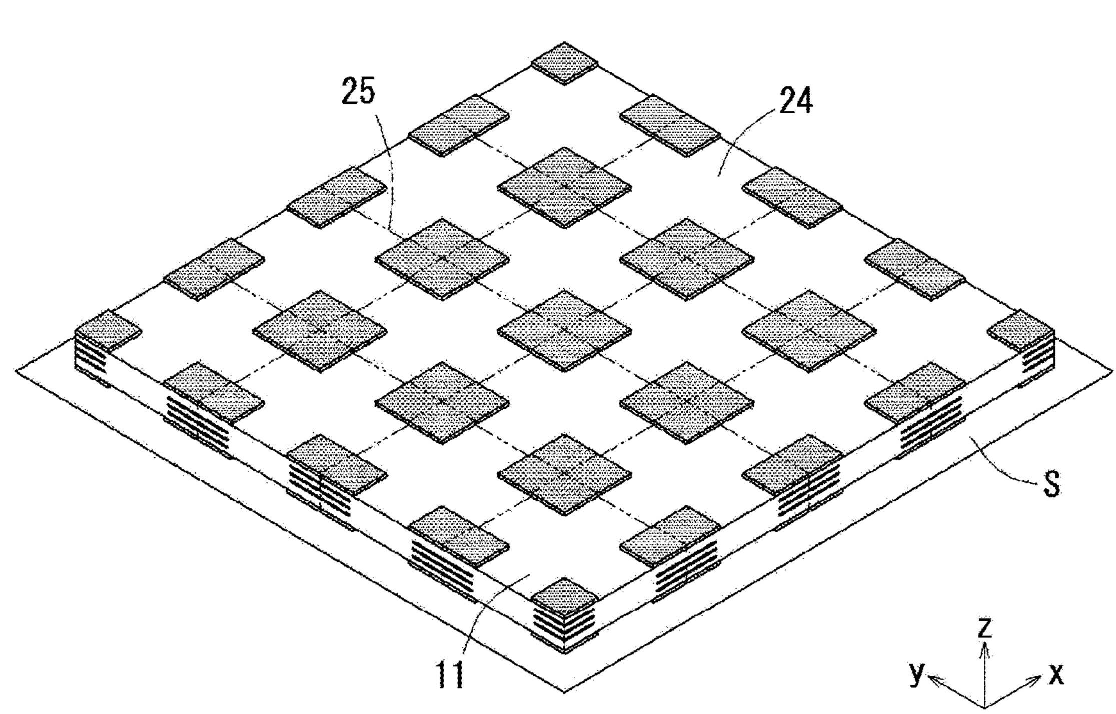
FIG. 14 is a perspective view of the mother multilayer body.
Figure 15:
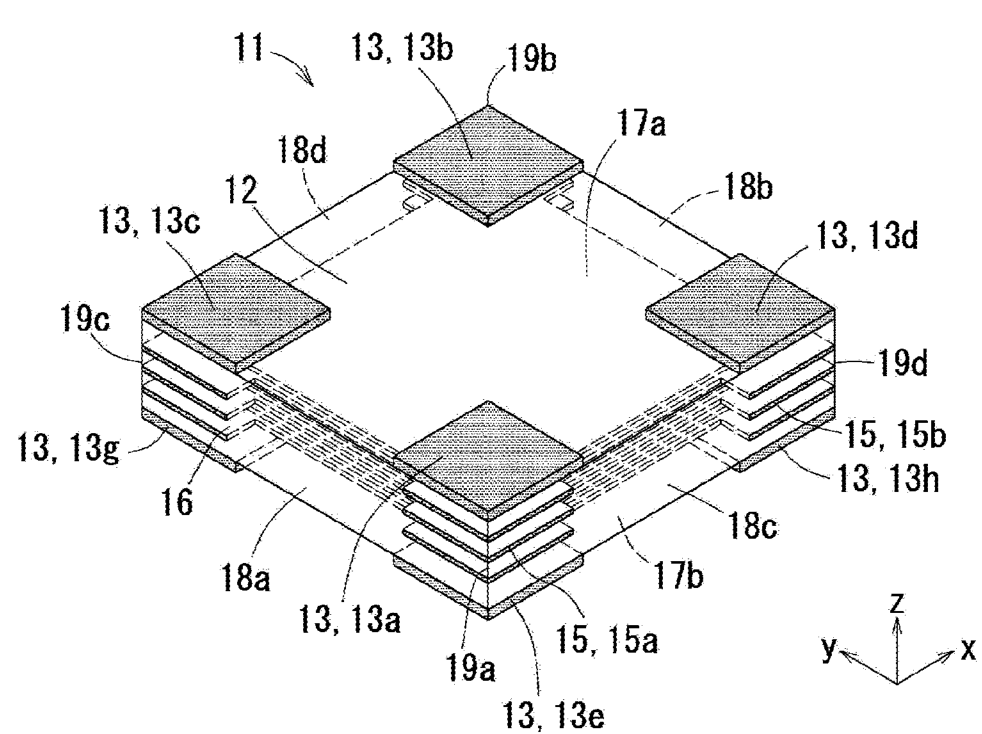
FIG. 15 is a perspective view of a base component precursor obtained by cutting the mother multilayer body.

A method of manufacturing the multilayer ceramic capacitor 10A will be described. FIG. 13 is a perspective view diagram for explaining steps of producing a mother multilayer body, FIG. 14 is a perspective view of the mother multilayer body, and FIG. 15 is a perspective view of a base component precursor obtained by cutting the mother multilayer body. In FIGS. 13 to 15, the inner electrode patterns, the underlying electrode patterns, the end portions of the inner electrode patterns exposed on surfaces of the mother multilayer body, and the end portions of the inner electrode patterns exposed on surfaces of the base component are hatched to makes it easy to understand the illustration.

A method of manufacturing the multilayer ceramic capacitor 10A includes a first step, a second step, and a third step.

First Step

In the first step, a mother multilayer body for forming base component 11 precursors is produced. In the first step, first, raw material powder containing $BaTiO_3$ as a major component is prepared, and an organic vehicle and an sintering aid are mixed with the raw material powder, so that a ceramic slurry is prepared. The organic vehicle used to prepare the ceramic slurry may be, for example, a solution of a resin such as a butyral-based resin dissolved in a solvent of a mixture of ethyl alcohol and toluene. The sintering aid may be, for example, an $SiO_2$—BaO—CaO-based glass component. Next, the prepared ceramic slurry is used to form a ceramic green sheet 21 that will become dielectric layers 16 on a carrier film by a sheet forming method such as a die coater method, a doctor blade method, or a gravure coater method.

Powder containing Ni as a major component is mixed with an organic vehicle to prepare a conductivity paste for the inner electrodes 15. The organic vehicle used to prepare the conductivity paste may be, for example, a solution of a resin such as ethyl cellulose dissolved in a solvent of a mixture of a dihydroterpineol-based solvent and butyl cellosolve. The conductivity paste may contain, for example, a dispersant such as oleic acid or polyethylene glycol.

In addition, powder containing Ni as a major component is mixed with an organic vehicle and ceramic powder to prepare a conductivity paste for the underlying electrodes 13. The ceramic powder may contain $BaTiO_3$ as a major component. The conductivity paste for the underlying electrodes 13 may contain an sintering aid. The sintering aid may be, for example, Si, Mg, Mn, or the like.

The $BaTiO_3$ powder that is used as the conductivity paste for the underlying electrodes 13 may have a smaller average particle diameter than the $BaTiO_3$ powder that is used for the ceramic slurry. For example, the average particle diameter of the $BaTiO_3$ powder that is used as the conductivity paste for the underlying electrodes 13 may be two thirds or less, a half or less, or one third or less of the average particle diameter of the $BaTiO_3$ powder that is used for the ceramic slurry. In this case, the ceramic particles ($BaTiO_3$ particles) contained in the conductivity paste for the underlying electrodes 13 are sintered more easily, and this in turn makes it more likely for aggregated sintered bodies A to be formed.

Since grain growth occurs during firing, the relationship in size of the powder mentioned above is not necessarily kept after firing. As a matter of course, the relationship in size mentioned above may be kept. In other words, the average particle diameter of the dielectric particles contained in aggregated sintered bodies A may be smaller than that of the dielectric particles contained in the dielectric layers 16. The former may be two thirds or less, a half or less, or one thirds or less of the latter.

Regarding the conductivity paste for the underlying electrodes 13, the weight ratio of $BaTiO_3$ to Ni may be 15% or more and 35% or less. When the weight ratio is 15% or more, aggregated sintered bodies A are more likely to be formed, and the separation between the underlying electrodes 13 and the multilayer body 12 is less likely to occur. When the weight ratio is 15% or more, the mismatch between the firing behavior of the underlying electrode 13 precursors and the firing behavior of the multilayer body 12 precursors during the firing of the base component 11 precursors tends to be small so that the separation between the underlying electrodes 13 and the multilayer body 12 is less likely to occur. When the weight ratio is 35% or less, the conductivity of the underlying electrodes 13 can be high, making it easy to form the outer electrodes 14.

Next, the conductivity paste for the inner electrodes 15 is used to produce ceramic green sheets 21 on which inner electrode patterns that will become inner electrodes 15 are printed. The conductivity paste for the underlying electrodes 13 is used to produce ceramic green sheets 21 on which underlying electrode patterns that will become underlying electrodes 13 are printed. The inner electrode patterns and the underlying electrode patterns can be printed by, for example, a printing method such as a screen printing method or a gravure printing method. In the following, a ceramic green sheet 21 on which inner electrode patterns are printed is sometimes referred to as an inner electrode sheet 22, and a ceramic green sheet 21 on which underlying electrode patterns are printed is sometimes referred to as an underlying electrode sheet 23.

When the underlying electrode sheet 23 is formed, the underlying electrode patterns may have a two-layer structure, and the amount of the sintering aid added to the layer closer to the multilayer body 12 may be larger than the amount of the sintering aid added to the layer closer to the outer electrode 14. In this case, the aggregation of ceramic particles in the region of the underlying electrode 13 precursor closer to the multilayer body 12 precursor (in other words, the formation of aggregated sintered bodies A) can be promoted, and this makes it more likely that the length ratio $R_P$ is 15% or more.

Next, as illustrated in FIG. 13, a specified number of inner electrode sheets 22 are stacked on an underlying electrode sheet 23, and an underlying electrode sheet 23 is further stacked on it, so that a temporary multilayer body is produced. When the temporary multilayer body is produced, the specified number of inner electrode sheets 22 may be stacked so as to be shifted from one another in the width direction (the y-axis direction) by half of the dimension of one inner electrode pattern in the width direction. In this case, inner electrode sheets 22 on which the same inner electrode patterns are printed can be used to form the first inner electrodes **15*a* and the second inner electrodes 15*b*. One or more ceramic green sheets 21 may be provided between each underlying electrode sheet 23 and the inner electrode sheets 22. This configuration reduces the possibility of the inner electrodes 15** having different polarities being short-circuited.

Next, the temporary multilayer body is pressed in the stacking direction, so that a mother multilayer body 24 as illustrated in FIG. 14 is produced. Pressing the temporary multilayer body can be performed by using, for example, an isostatic press machine. Note that the temporary multilayer body and the mother multilayer body 24 may be produced on a support sheet S as illustrated in FIGS. 13 and 14. The support sheet S may be an adhesive and releasable sheet, to and from which adhesion and separation is possible, such as a weakly adhesive sheet or a foamed release sheet. Note that the mother multilayer body 24 includes multiple base component 11 precursors, and each base component 11 precursor has substantially the same structure as the base component 11. In the following description, the terms and reference signs used for the base component 11 are sometimes used also for the base component 11 precursor.

Second Step

In the second step, the base component 11 is produced. First, the mother multilayer body 24 is cut along cutting lines 25 in a lattice shape, so that multiple base component 11 precursors as illustrated in FIG. 15 are produced. The mother multilayer body 24 can be cut by using, for example, a guillotine cutting machine, a dicing saw machine, or the like.

Next, the base component 11 precursors are fired. Although the firing temperature may be set as appropriate depending on the ceramic material contained in the ceramic green sheets, the metal material contained in the conductivity paste, and the like, it may be, for example, approximately 1100 to 1250° C. Note that the base component 11 precursors before firing may be subjected to a degreasing treatment. The degreasing treatment may be performed in an air atmosphere, an inert gas atmosphere, or a reducing atmosphere. The degreasing treatment may be performed under atmospheric pressure or under reduced pressure. In addition, the base component 11 precursors after firing may be subjected to a reoxidation treatment.

Next, the base component 11 precursors are placed into a rotation pot containing abrasives and subjected to barrel polishing. This process removes burrs on the surfaces of the base component 11 precursors, rounds the corner portions, and sufficiently exposes the end portions of the inner electrodes 15 at the corner portions 19*a* to 19*d* of the multilayer bodies 12. Thus, the base components 11 as illustrated in FIG. 8 are produced.

Note that when the mother multilayer body 24 is produced, the underlying electrode sheets 23 located as the uppermost layer and the lowermost layer of the temporary multilayer body (see FIG. 13) may be omitted, and a mother multilayer body composed of multiple multilayer body 12 precursors (in other words, without the underlying electrode 13 precursors) may be produced. In this case, the underlying electrode 13 precursors may be printed on the mother multilayer body, and then the mother multilayer body may be cut, so that the base component 11 precursors can be produced. Alternatively, the mother multilayer body may be cut, and then the underlying electrode 13 precursors may be printed on the multilayer body 12 precursors obtained by cutting, so that the base component 1 precursors can be produced. The underlying electrode 13 precursors can be printed by, for example, a printing method such as a screen printing method or a gravure printing method.

Third Step

In the third step, the outer electrodes 14 are formed on the base component 11. In the third step, the outer electrodes 14 composed of a conductive material containing Cu, Ni, Sn, or the like as a major component are formed at specified positions on the base component 11 by using, for example, a plating method such as an electroless plating method or an electroplating method. Each outer electrode 14 may be composed of a single plating layer or may be composed of multiple plating layers. When each outer electrode 14 includes a first plating layer, a second plating layer, and a third plating layer, the first plating layer may be a Cu plating layer, the second plating layer may be a Ni plating layer, and the third plating layer may be a Sn plating layer.

The multilayer ceramic capacitor 10A can be manufactured as described above. Note that the multilayer ceramic capacitor 10 can be manufactured by the same or a similar manufacturing method as the manufacturing method described above by changing the inner electrode patterns of the inner electrode sheets 22 and changing the underlying electrode patterns of the underlying electrode sheets 23.

Although the embodiments of the present disclosure have been described in details as above, the present disclosure is not limited to the embodiments described above. Various changes, improvements, and the like can be made within a scope not departing from the spirit of the present disclosure.

The multilayer electronic component of the present disclosure may be, for example, a multilayer ceramic capacitor of a third embodiment illustrated in FIGS. 16 to 19, and a multilayer ceramic capacitor of a fourth embodiment illustrated in FIGS. 20 to 23. The following describes multilayer ceramic capacitors of the third embodiment and the fourth embodiment.

Figure 16:
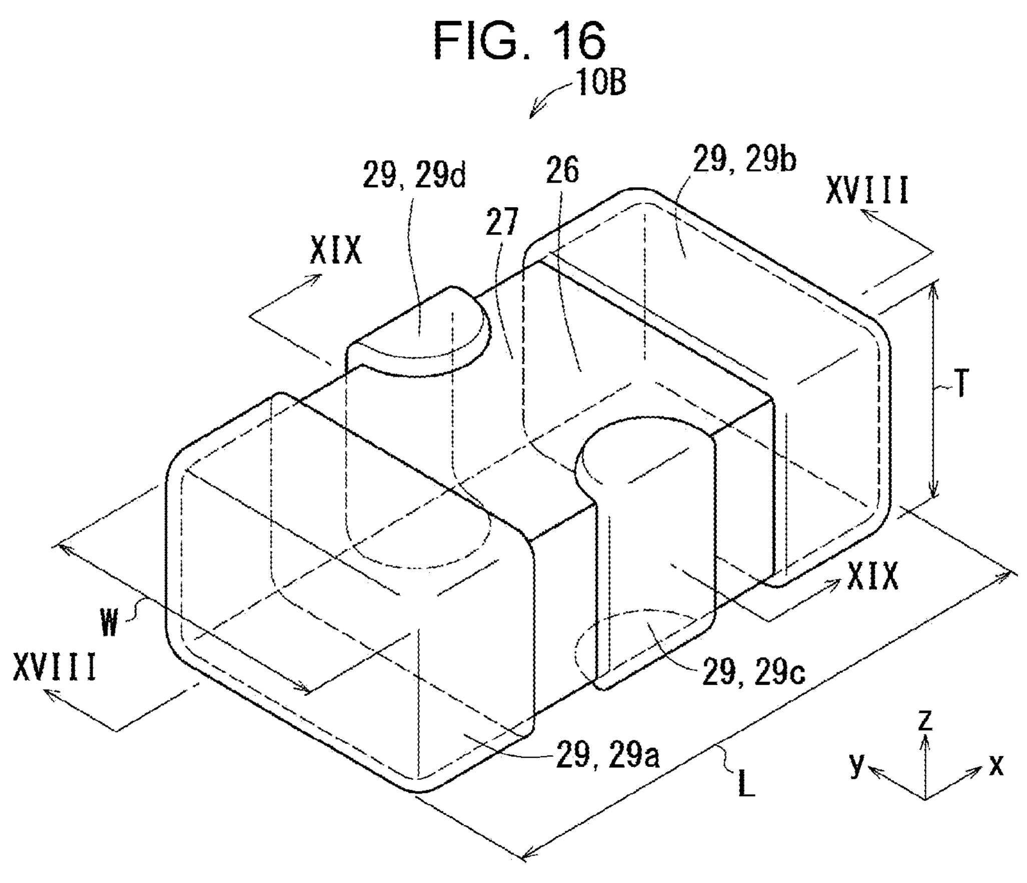
FIG. 16 is a perspective view of a multilayer ceramic capacitor of a third embodiment.
Figure 17:
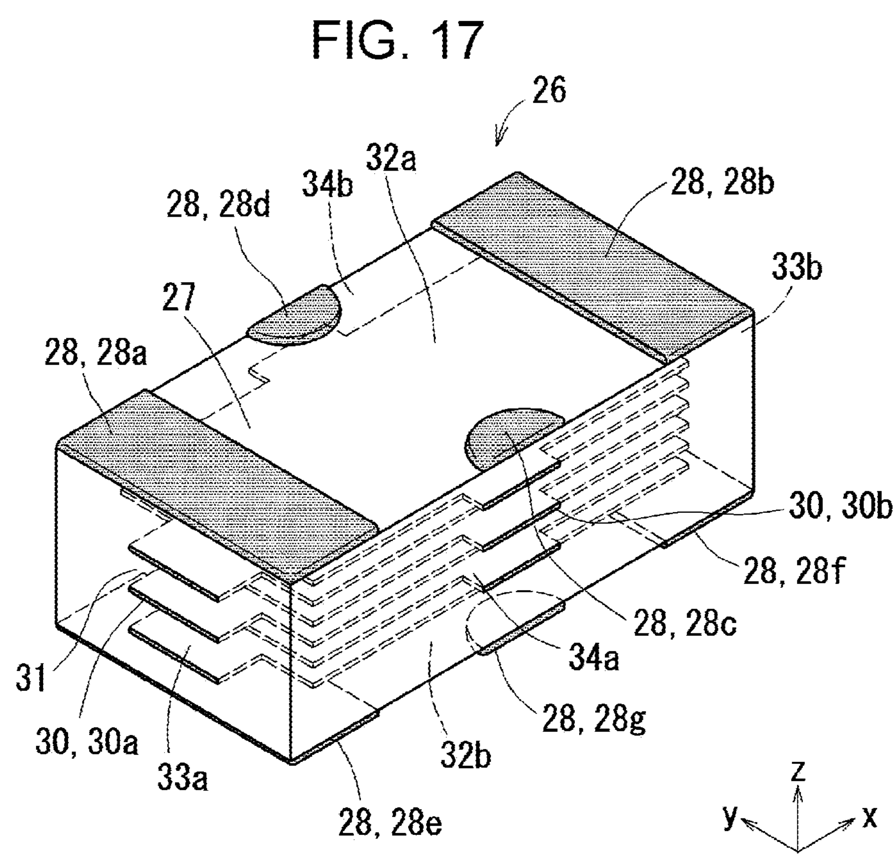
Figure 18:
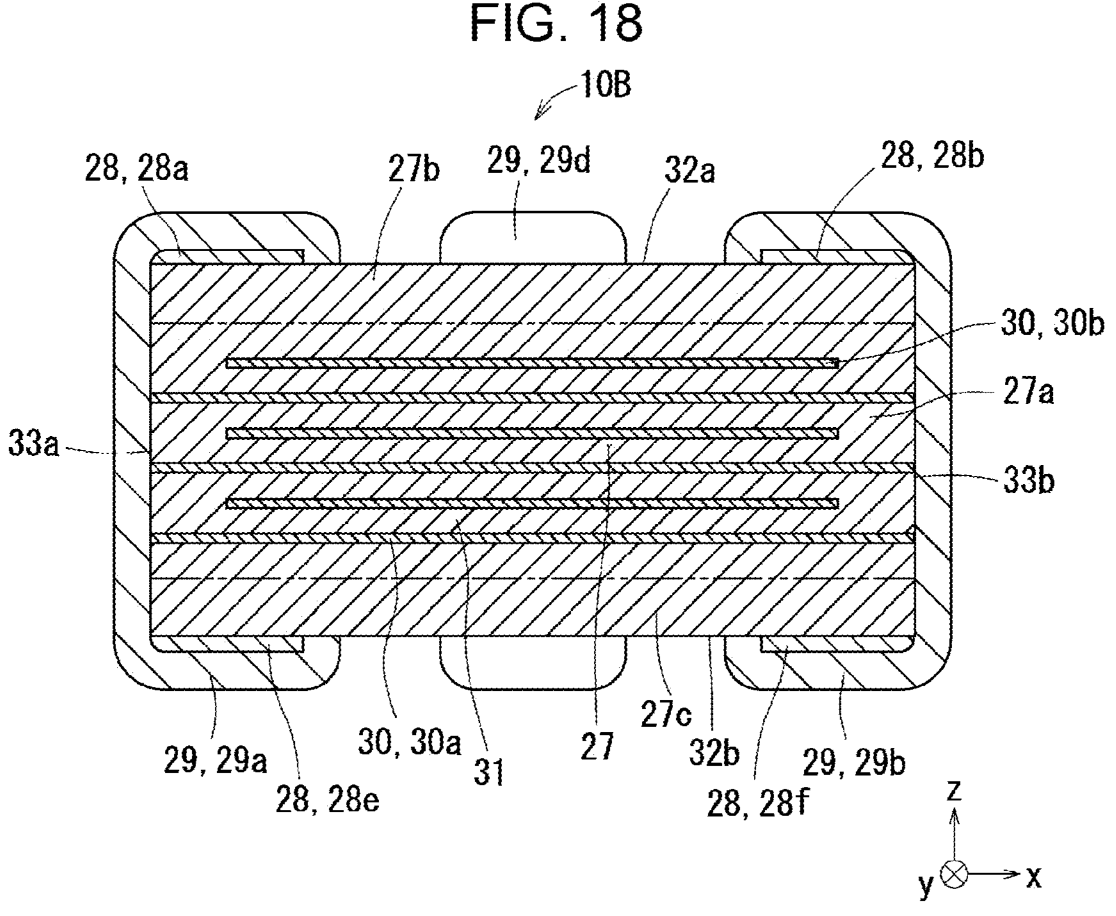
FIG. 18 is a diagram illustrating an example of a cross section taken along cross-section line XVIII-XVIII in FIG. 16.
Figure 19:
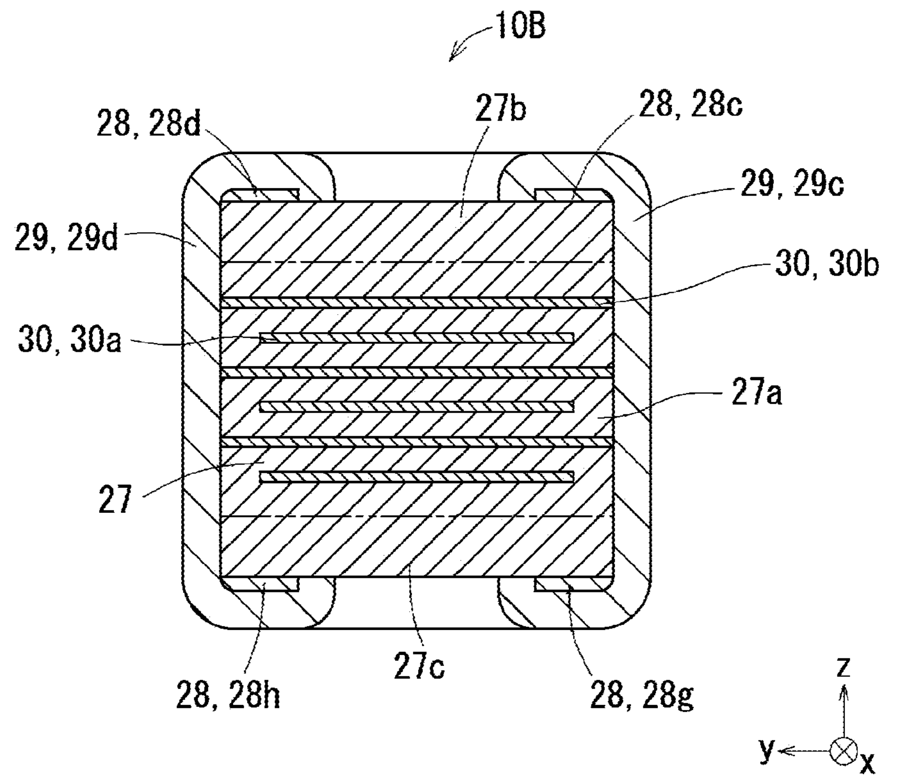
FIG. 19 is a diagram illustrating an example of a cross section taken along cross-section line XIX-XIX in FIG. 16.
Figure 20:
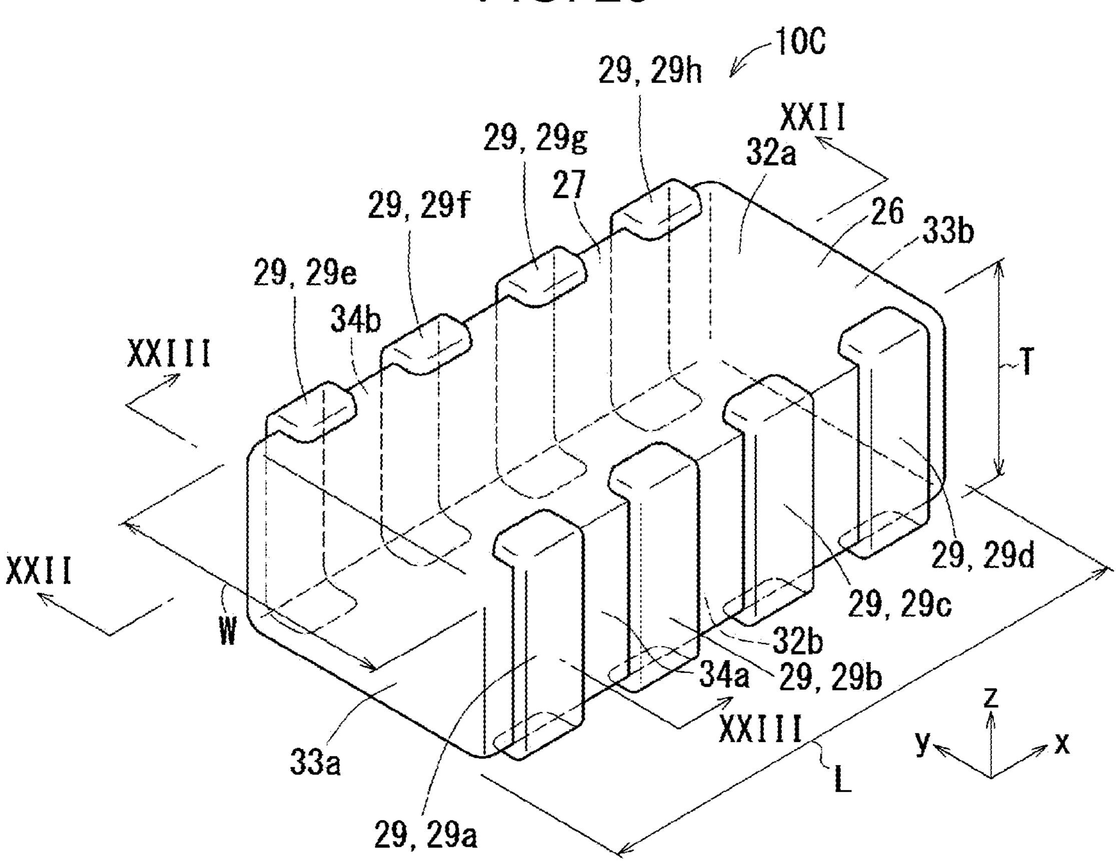
FIG. 20 is a perspective view of a multilayer ceramic capacitor of a fourth embodiment.
Figure 21:
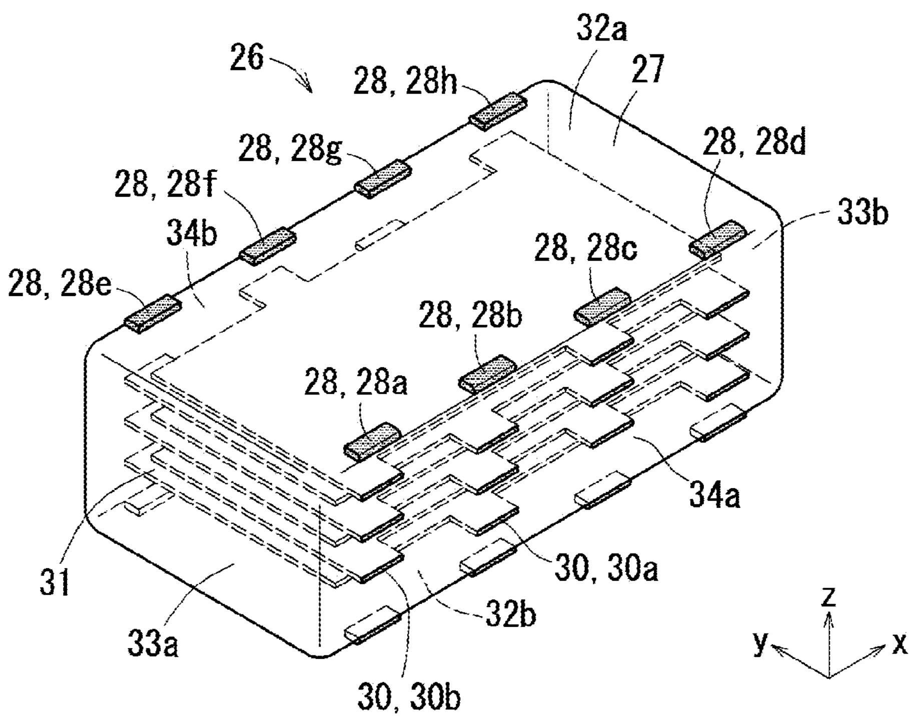
FIG. 21 is a perspective view of a base component of the multilayer ceramic capacitor in FIG. 20.
Figure 22:
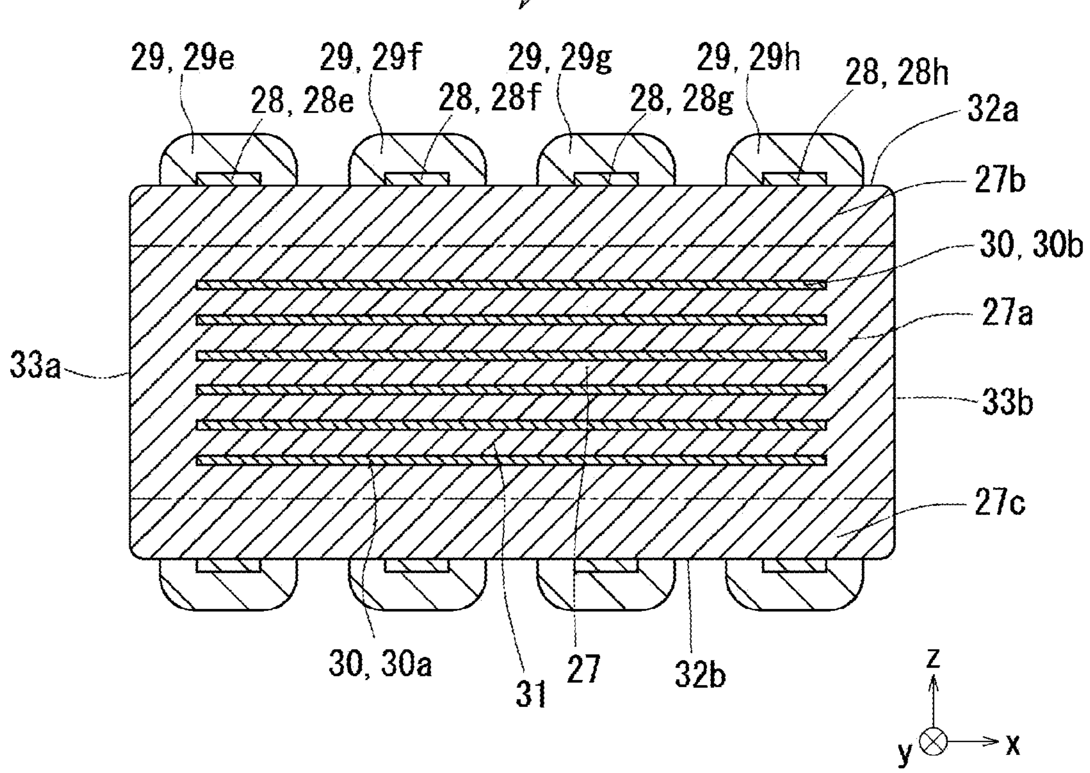
FIG. 22 is a diagram illustrating an example of a cross section taken along cross-section line XXII-XXII in FIG. 20.
Figure 23:
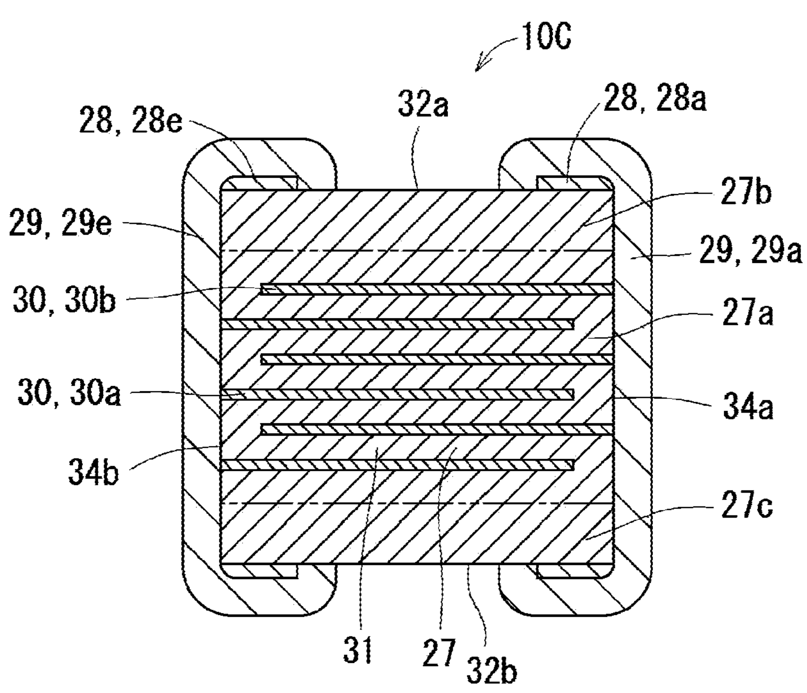
FIG. 23 is a diagram illustrating an example of a cross section taken along cross-section line XXIII-XXIII in FIG. 20.

FIG. 16 is a perspective view of a multilayer ceramic capacitor of the third embodiment, FIG. 17 is a perspective view of a base component of the multilayer ceramic capacitor in FIG. 16, FIG. 18 is a diagram illustrating an example of a cross section taken along cross-section line XVIII-XVIII in FIG. 16, and FIG. 19 is a diagram illustrating an example of a cross section taken along cross-section line XIX-XIX in FIG. 16. FIG. 20 is a perspective view of a multilayer ceramic capacitor of the fourth embodiment, FIG. 21 is a perspective view of a base component of the multilayer ceramic capacitor in FIG. 20, FIG. 22 is a diagram illustrating an example of a cross section taken along cross-section line XXII-XXII in FIG. 20, and FIG. 23 is a diagram illustrating an example of a cross section taken along cross-section line XXIII-XXIII in FIG. 20.

As illustrated in FIG. 16, a multilayer ceramic capacitor 10B of the third embodiment includes a base component 26 and multiple outer electrodes 29. As illustrated in FIG. 17, the base component 26 includes a multilayer body 27 and multiple underlying electrodes 28. The multilayer ceramic capacitor 10B may be a thin multilayer ceramic capacitor in which the dimension T in the height direction (the z-axis direction) is smaller than the dimension L in the longitudinal direction (the x-axis direction) and the dimension W in the width direction (the y-axis direction).

The multilayer body 27 includes multiple inner electrodes 30 and multiple dielectric layers 31 alternately stacked. The multilayer body 27 may have an approximately rectangular parallelepiped shape. The multilayer body 27 includes a first surface 32*a* and a second surface 32*b* opposed to each other in the stacking direction, a first end surface 33*a* and a second end surface 33*b* opposed to each other in the longitudinal direction, and a first side surface 34*a* and a second side surface 34*b* opposed to each other in the width direction.

The dielectric layers 31 are composed of, for example, a ceramic material containing $BaTiO_3$, $CaTiO_3$, $SrTiO_3$, $BaZrO_3$, $CaZrO_3$, or the like as a major component. The ceramic material may contain a glass component. The glass component may be, for example, an $SiO_2$—BaO—CaO-based glass component. Each dielectric layer 31 may have a thickness of, for example, approximately 0.1 to 1 μm.

As illustrated in FIGS. 17 to 19, the multiple inner electrodes 30 include multiple first inner electrodes 30*a* and multiple second inner electrodes 30*b*. Each first inner electrode 30*a* has end portions exposed on the first end surface 33*a* and the second end surface 33*b*. Each second inner electrode 30*b* has end portions exposed on the first side surface 34*a* and the second side surface 34*b*. The first inner electrodes 30*a* and the second inner electrodes 30*b* have different polarities.

The inner electrodes 30 are composed of, for example, a metal material containing Ni, Cu, Sn, or the like as a major component. The inner electrodes 30 may contain, for example, a ceramic material such as $BaTiO_3$, $CaTiO_3$, $SrTiO_3$, $BaZrO_3$, or $CaZrO_3$. Each inner electrode 30 may have a thickness of, for example, approximately 0.1 to 1.0 μm.

As illustrated in FIGS. 18 and 19, the multilayer body 27 may include a capacitive portion 27*a* and cover portions 27*b* and 27*c*. The capacitive portion 27*a* includes the multiple inner electrodes 30 and the multiple dielectric layers 31 alternately stacked and has capacitance. The cover portions 27*b* and 27*c* are located at both ends of the capacitive portion 27*a* in the stacking direction. Each of the cover portions 27*b* and 27*c* is composed of one or more dielectric layers and need not have capacitance.

The cover portions 27*b* and 27*c* (their dielectric layers) are composed of, for example, a ceramic material containing $BaTiO_3$, $CaTiO_3$, $SrTiO_3$, $BaZrO_3$, $CaZrO_3$, or the like as a major component. The cover portions 27*b* and 27*c* may be compose of the same ceramic material as the dielectric layers 31.

The multiple underlying electrodes 28 include a first underlying electrode 28*a*, a second underlying electrode 28*b*, a third underlying electrode 28*c*, and a fourth underlying electrode 28*d*. The first underlying electrode 28*a* is located on the first surface 32*a* and close to the first end surface 33*a*, and the second underlying electrode 28*b* is located on the first surface 32*a* and close to the second end surface 33*b*. The third underlying electrode 28*c* is located on the first surface 32*a* and close to the first side surface 34*a*, and the fourth underlying electrode 28*d* is located on the first surface 32*a* and close to the second side surface 34*b*. The third underlying electrode 28*c* and the fourth underlying electrode 28*d* may be located at center portions of the first surface 32*a* in the longitudinal direction. The third underlying electrode 28*c* and the fourth underlying electrode 28*d* may have, for example, an approximately semicircular shape, an approximately rectangular shape, an approximately triangular shape, or other shapes in plan view.

The underlying electrodes 28 may include a fifth underlying electrode 28*e*, a sixth underlying electrode 28*f*, a seventh underlying electrode 28*g*, and an eighth underlying electrode 28*h*. The fifth underlying electrode 28*e* is located on the second surface 32*b* and close to the first end surface 33*a*, and the sixth underlying electrode 28*f* is located on the second surface 32*b* and close to the second end surface 33*b*. The seventh underlying electrode 28*g* is located on the second surface 32*b* and close to the first side surface 34*a*, and the eighth underlying electrode 28*h* is located on the second surface 32*b* and close to the second side surface 34*b*. The fifth to eighth underlying electrodes 28*e* to 28*h* may have the same or similar configurations as the first to fourth underlying electrodes 28*a* to 28*d* except that they are located on the second surface 32*b*.

The underlying electrodes 28 are composed of, for example, a conductive material containing Ni, Cu, Sn, or the like as a major component. The conductive material may contain, for example, a ceramic material such as $BaTiO_3$, $CaTiO_3$, $SrTiO_3$, $BaZrO_3$, or $CaZrO_3$. This makes it easy to increase the degree of adhesion between the underlying electrodes 28 and the multilayer body 27. The ceramic material may contain Si, Mg, Mn, or the like. Each underlying electrode 28 may be thicker than one inner electrode 30. Each underlying electrode 28 may have a thickness of, for example, approximately 1 to 5 μm.

As illustrated in FIG. 16, the multiple outer electrodes 29 include a first outer electrode 29*a*, a second outer electrode 29*b*, a third outer electrode 29*c*, and a fourth outer electrode 29*d*.

The first outer electrode 29*a* extends from the first end surface 33*a* at least onto the first surface 32*a* and is connected to the multiple first inner electrodes 30*a* and the first underlying electrode 28*a*. The first outer electrode 29*a* may cover the first underlying electrode 28*a*. The first outer electrode 29*a* may extend from the first end surface 33*a* onto the first surface 32*a* and the second surface 32*b* and be connected to the multiple first inner electrodes 30*a*, the first underlying electrode 28*a*, and the fifth underlying electrode 28*e*. The first outer electrode 29*a* may cover the first underlying electrode 28*a* and the fifth underlying electrode 28*e*. The first outer electrode 29*a* may extend from the first end surface 33*a* onto the first surface 32*a*, the second surface 32*b*, the first side surface 34*a*, and the second side surface 34*b*.

The second outer electrode 29*b* extends from the second end surface 33*b* at least onto the first surface 32*a* and is connected to the multiple second inner electrodes 30*b* and the second underlying electrode 28*b*. The second outer electrode 29*b* may cover the second underlying electrode 28*b*. The second outer electrode 29*b* may extend from the second end surface 33*b* onto the first surface 32*a* and the second surface 32*b* and be connected to the multiple second inner electrodes 30*b*, the second underlying electrode 28*b*, and the sixth underlying electrode 28*f*. The second outer electrode 29*b* may cover the second underlying electrode 28*b* and the sixth underlying electrode 28*f*. The second outer electrode 29*b* may extend from the second end surface 33*b* onto the first surface 32*a*, the second surface 32*b*, the first side surface 34*a*, and the second side surface 34*b*.

The third outer electrode 29*c* extends from the first side surface 34*a* at least onto the first surface 32*a* and is connected to the multiple second inner electrodes 30*b* and the third underlying electrode 28*c*. The third outer electrode 29*c* may cover the third underlying electrode 28*c*. The third outer electrode 29*c* may extend from the first side surface 34*a* to the first surface 32*a* and the second surface 32*b* and be connected to the multiple second inner electrodes 30*b*, the third underlying electrode 28*c*, and the seventh underlying electrode 28*g*. The third outer electrode 29*c* may cover the third underlying electrode 28*c* and the seventh underlying electrode 28*g*.

The fourth outer electrode 29*d* extends from the second side surface 34*b* at least onto the first surface 32*a* and is connected to the multiple second inner electrodes 30*b* and the fourth underlying electrode 28*d*. The fourth outer electrode 29*d* may cover the fourth underlying electrode 28*d*. The fourth outer electrode 29*d* may extend from the second side surface 34*b* onto the first surface 32*a* and the second surface 32*b* and be connected to the multiple second inner electrodes 30*b*, the fourth underlying electrode 28*d*, and the eighth underlying electrode 28*h*. The fourth outer electrode 29*d* may cover the fourth underlying electrode 28*d* and the eighth underlying electrode 28*h*.

Each outer electrode 29 may be a plating layer. Each outer electrode 29 may be composed of two or more plating layers. Each outer electrode 29 may be composed of a first layer connected to the corresponding underlying electrodes 28 and inner electrodes 30 and a second layer covering the first layer. Each outer electrode 29 may be composed of a first layer connected to the corresponding underlying electrodes 28 and inner electrodes 30, a second layer covering the first layer, and a third layer covering the second layer.

A multilayer ceramic capacitor according to a fourth embodiment will be described. In the following description, the same or similar components as in the multilayer ceramic capacitor of the third embodiment are referred to as the same terms and denoted by the same reference signs, and detailed description thereof is omitted.

As illustrated in FIG. 20, a multilayer ceramic capacitor 10C of the fourth embodiment includes a base component 26 and multiple outer electrodes 29. As illustrated in FIG. 21, the base component 26 includes a multilayer body 27 and multiple underlying electrodes 28. The multilayer ceramic capacitor 10C may be a thin multilayer ceramic capacitor in which the dimension T in the height direction (the z-axis direction) is smaller than the dimension L in the longitudinal direction (the x-axis direction) and the dimension W in the width direction (the y-axis direction).

As illustrated in FIGS. 21 to 23, the multilayer body 27 includes multiple inner electrodes 30 and multiple dielectric layers 31 alternately stacked. The multilayer body 27 may have an approximately rectangular parallelepiped shape. The multilayer body 27 includes a first surface 32*a* and a second surface 32*b* opposed to each other in the stacking direction, a first end surface 33*a* and a second end surface 33*b* opposed to each other in the longitudinal direction, and a first side surface 34*a* and a second side surface 34*b* opposed to each other in the width direction.

As illustrated in FIGS. 21 to 23, the multiple inner electrodes 30 include multiple first inner electrodes 30*a* and multiple second inner electrodes 30*b*.

Each first inner electrode 30*a* has multiple end portions exposed on the first side surface 34*a* and multiple end portions exposed on the second side surface 34*b*. Each second inner electrode 30*b* has multiple end portions exposed on the first side surface 34*a* and multiple end portions exposed on the second side surface 34*b*. On the first side surface 34*a*, the positions of the multiple portions where the first inner electrodes 30*a* are exposed differ in the longitudinal direction from the positions of the multiple portions where the second inner electrodes 30*b* are exposed. On the second side surface 34*b*, the positions of the multiple portions where the first inner electrodes 30*a* are exposed differ in the longitudinal direction from the positions of the multiple portions where the second inner electrodes 30*b* are exposed. The first inner electrodes 30*a* and the second inner electrodes 30*b* have different polarities.

As illustrated in FIGS. 22 and 23, the multilayer body 27 may include a capacitive portion 27*a* and cover portions 27*b* and 27*c*. The capacitive portion 27*a* includes the multiple inner electrodes 30 and the multiple dielectric layers 31 alternately stacked and has capacitance. The cover portions 27*b* and 27*c* are located at both ends of the capacitive portion 27*a* in the stacking direction. Each of the cover portions 27*b* and 27*c* is composed of one or more dielectric layers and need not have capacitance.

The multiple underlying electrodes 28 include a first underlying electrode 28*a*, a second underlying electrode 28*b*, a third underlying electrode 28*c*, a fourth underlying electrode 28*d*, a fifth underlying electrode 28*e*, a sixth underlying electrode 28*f*, a seventh underlying electrode 28*g*, and an eighth underlying electrode 28*h*. The first to fourth underlying electrodes 28*a* to 28*d* are located on the first surface 32*a* and close to the first side surface 34*a*. The fifth to eighth underlying electrodes 28*e* to 28*h* are located on the first surface 32*a* and close to the second side surface 34*b*.

The underlying electrodes 28 may include ninth to sixteenth underlying electrodes. The ninth to twelfth underlying electrodes are located on the second surface 32*b* and close to the first side surface 34*a*. The thirteenth to sixteenth underlying electrodes are located on the second surface 32*b* and close to the second side surface 34*b*. The ninth to twelfth underlying electrodes may have the same or similar configurations as the first to fourth underlying electrodes 28*a* to 28*d* except that they are located on the second surface 32*b*. The thirteenth to sixteenth underlying electrodes may have the same or similar configurations as the fifth to eighth underlying electrodes 28*e* to 28*h* except that they are located on the second surface 32*b*.

As illustrated in FIG. 20, the multiple outer electrodes 29 include a first outer electrode 29*a*, a second outer electrode 29*b*, a third outer electrode 29*c*, a fourth outer electrode 29*d*, a fifth outer electrode 29*e*, a sixth outer electrode 29*f*, a seventh outer electrode 29*g*, and an eighth outer electrode 29*h*.

The first outer electrode 29*a* and the third outer electrode 29*c* extend from the first side surface 34*a* at least onto the first surface 32*a* and are connected to the multiple second inner electrodes 30*b*. The first outer electrode 29*a* and the third outer electrode 29*c* are connected to the first underlying electrode 28*a* and the third underlying electrode 28*c*, respectively. The first outer electrode 29*a* and the third outer electrode 29*c* may cover the first underlying electrode 28*a* and the third underlying electrode 28*c*, respectively. The first outer electrode 29*a* may extend from the first side surface 34*a* onto the first surface 32*a* and the second surface 32*b* and be connected to the first underlying electrode 28*a* and the ninth underlying electrode. The first outer electrode 29*a* may cover the first underlying electrode 28*a* and the ninth underlying electrode. The third outer electrode 29*c* may extend from the first side surface 34*a* onto the first surface 32*a* and the second surface 32*b* and be connected to the third underlying electrode 28*c* and the eleventh underlying electrode. The third outer electrode 29*c* may cover the third underlying electrode 28*c* and the eleventh underlying electrode.

The second outer electrode 29*b* and the fourth outer electrode 29*d* extend from the first side surface 34*a* at least onto the first surface 32*a* and are connected to the multiple first inner electrodes 30*a*. The second outer electrode 29*b* and the fourth outer electrode 29*d* are connected to the second underlying electrode 28*b* and the fourth underlying electrode 28*d*, respectively. The second outer electrode 29*b* and the fourth outer electrode 29*d* may cover the second underlying electrode 28*b* and the fourth underlying electrode 28*d*, respectively. The second outer electrode 29*b* may extend from the first side surface 34*a* onto the first surface 32*a* and the second surface 32*b* and be connected to the second underlying electrode 28*b* and the tenth underlying electrode. The second outer electrode 29*b* may cover the second underlying electrode 28*b* and the tenth underlying electrode. The fourth outer electrode 29*d* may extend from the first side surface 34*a* onto the first surface 32*a* and the second surface 32*b* and be connected to the fourth underlying electrode 28*d* and the twelfth underlying electrode. The fourth outer electrode 29*d* may cover the fourth underlying electrode 28*d* and the twelfth underlying electrode.

The sixth outer electrode 29*f* and the eighth outer electrode 29*h* extend from the second side surface 34*b* at least onto the first surface 32*a* and are connected to the multiple second inner electrodes 30*b*. The sixth outer electrode 29*f* and the eighth outer electrode 29*h* are connected to the sixth underlying electrode 28*f* and the eighth underlying electrode 28*h*, respectively. The sixth outer electrode 29*f* and the eighth outer electrode 29*h* may cover the sixth underlying electrode 28*f* and the eighth underlying electrode 28*h*, respectively. The sixth outer electrode 29*f* may extend from the second side surface 34*b* onto the first surface 32*a* and the second surface 32*b* and be connected to the sixth underlying electrode 28*f* and the fourteenth underlying electrode. The sixth outer electrode 29*f* may cover the sixth underlying electrode 28*f* and the fourteenth underlying electrode. The eighth outer electrode 29*h* may extend from the second side surface 34*b* to the first surface 32*a* and the second surface 32*b* and be connected to the eighth underlying electrode 28*h* and the sixteenth underlying electrode. The eighth outer electrode 29*h* may cover the eighth underlying electrode 28*h* and the sixteenth underlying electrode.

The fifth outer electrode 29*e* and the seventh outer electrode 29*g* extend from the second side surface 34*b* at least onto the first surface 32*a* and are connected to the multiple first inner electrodes 30*a*. The fifth outer electrode 29*e* and the seventh outer electrode 29*g* are connected to the fifth underlying electrode 28*e* and the seventh underlying electrode 28*g*, respectively. The fifth outer electrode 29*e* and the seventh outer electrode 29*g* may cover the fifth underlying electrode 28*e* and the seventh underlying electrode 28*g*, respectively. The fifth outer electrode 29*e* may extend from the second side surface 34*b* onto the first surface 32*a* and the second surface 32*b* and be connected to the fifth underlying electrode 28*e* and the thirteenth underlying electrode. The fifth outer electrode 29*e* may cover the fifth underlying electrode 28*e* and the thirteenth underlying electrode. The seventh outer electrode 29*g* may extend from the second side surface 34*b* onto the first surface 32*a* and the second surface 32*b* and be connected to the seventh underlying electrode 28*g* and the fifteenth underlying electrode. The seventh outer electrode 29*g* may cover the seventh underlying electrode 28*g* and the fifteenth underlying electrode.

Hereinafter, the configuration of the underlying electrodes 28 of the multilayer ceramic capacitors 10B and 10C will be described. The description of the aggregated sintered bodies A and other components in the multilayer ceramic capacitors 10 and 10A may be applied to the multilayer ceramic capacitors 10B and 10C unless a contradiction occurs. The following is a brief explanation, just in case.

In the multilayer ceramic capacitors 10B and 10C, in the same or a similar manner as in the multilayer ceramic capacitors 10 and 10A illustrated in FIG. 4, the underlying electrodes 28 contain multiple aggregated sintered bodies A. At least part of the multiple aggregated sintered bodies A (hereinafter also referred to as the interface aggregated sintered bodies) are located on the interface B between the underlying electrode 28 and the multilayer body 27. Each interface aggregated sintered body is formed by aggregation so as to include a portion P of the interface B between the underlying electrode 28 and the multilayer body 27. A portion of the interface aggregated sintered body is located at a portion P and bridged to a ceramic sintered body composing the multilayer body 27.

In a cross-sectional view of the multilayer ceramic capacitors 10B and 10C in the stacking direction, the ratio of the length of the multiple portions P to the length of the interface B may be 15% or more in the same or a similar manner as in the multilayer ceramic capacitors 10 and 10A illustrated in FIG. 5.

In a cross-sectional view of the multilayer ceramic capacitors 10B and 10C in the stacking direction, the ratio of the area of the multiple aggregated sintered bodies A to the cross-sectional area of the underlying electrode 28 may be 21% or more and 44% or less.

In the same or a similar manner as in the interface aggregated sintered bodies (see FIG. 4) of the multilayer ceramic capacitors 10 and 10A, in a cross-sectional view of the underlying electrode 28 in the stacking direction, the interface aggregated sintered bodies may be in the form of protrusions extending from the portions P.

The underlying electrodes 28 are not limited to ones substantially containing a glass component.

The ceramic green sheets used to form the multilayer body 27 precursor may contain a glass component.

In the same or a similar manner as in the multilayer ceramic capacitors 10 and 10A illustrated in FIG. 6, the multilayer ceramic capacitors 10B and 10C may have a configuration in which when it is assumed that a cross section of the underlying electrode 28 in the stacking direction is divided in the stacking direction into a first region close to the multilayer body 27 and a second region away from the multilayer body 27, a larger number of multiple aggregated sintered bodies A (multiple aggregated sintered bodies A that appear in the cross section) are present in the second region than in the first region.

Although not specifically illustrated, still other embodiments will be described. Note that symbols used in the first to fourth embodiments are used in some cases in the following description, for convenience. The following description may be applied to embodiments other than the embodiment from which symbols are used, unless a contradiction or the like occurs.

Underlying electrodes 13 may be embedded into the multilayer body 12 (more specifically, the cover portions 12*b* and 12*c*) with their upper surfaces or lower surfaces exposed to the outside of the multilayer body 12. In other words, the underlying electrodes 13 may be sunk into the cover portions 12*b* and 12*c*. From a different perspective, the first surface 17*a* and the second surface 17*b* of the multilayer body 12 need not be flat and may be recessed at the positions of the underlying electrodes 13. For convenience, the following description focuses on underlying electrodes 13 on the upper surface of the multilayer body 12. The upper surfaces of the embedded underlying electrodes 13 may be flush with or higher than the surface of the region of the first surface 17*a* where the underlying electrodes 13 are not present.

Note that even when the underlying electrodes 13 are embedded as described above, it can be said that the underlying electrodes 13 are located on the first surface 17*a* or the second surface 17*b*. In other words, the bottom surfaces of the recesses where the underlying electrodes 13 are located are part of the first surface 17*a* or the second surface 17*b* in the multilayer body 12.

The method of producing the embedded underlying electrodes 13 as mentioned above is not particularly limited. For example, in an example of the upper surface side, the cover portion 12*b* may be produced by using two-layer ceramic green sheets. Underlying electrodes 13 precursors are printed onto the ceramic green sheet for the lower layer. Cutouts are formed in the ceramic green sheet for the upper layer at positions where the underlying electrodes 13 are located. With this process, the embedded underlying electrodes 13 are produced. Additionally or alternatively, underlying electrode 13 precursors may be sunk into ceramic green sheets by pressing.

A capacitor may have an exterior resin that covers the entire structure shown as an example in FIG. 1 and lead wires connected to the outer electrodes and extending from the exterior resin. From a different perspective, a capacitor may be for through-hole mounting instead of surface mounting.

The two types of inner electrodes connected to mutually different outer electrodes may be alternately stacked two by two, instead of one by one. In this case, for example, the dielectric layer between two inner electrodes connected to the same outer electrode and opposed to each other may be thinner than the dielectric layer between two inner electrodes connected to different outer electrodes and opposed to each other. As can be understood from the explanation above, multiple dielectric layers are not limited to ones having the same shape and size.

Two types of inner electrodes connected to mutually different outer electrodes are not limited to ones opposed to each other. For example, two types of inner electrodes connected to mutually different outer electrodes may be provided in the same layer, and an inner electrode opposed to the two types of inner electrodes mentioned above may be provided, so that a circuit including two parallel flat-plate capacitors connected in series can be formed. Alternatively, a circuit including three or more parallel flat-plate capacitors connected in series may be formed.

In the first embodiment, since the inner electrodes 5 are within the width (the y direction) of the dielectric layers 6, the inner electrodes 5 are not exposed from the side surfaces 9*a* and 9*b* of the multilayer body 2. However, a configuration in which the inner electrodes 5 are not exposed may be achieved by overlaying dielectric layers on the side surfaces 9*a* and 9*b*. From a different perspective, the entire base component 1 need not be in a stacked structure.

The present disclosure can be implemented in the following aspects (1) to (9).

(1) A multilayer electronic component including:

a multilayer body including multiple inner electrodes and multiple dielectric layers alternately stacked and including a first surface and a second surface opposed to each other in a stacking direction, a first end surface and a second end surface opposed to each other in a longitudinal direction orthogonal to the stacking direction, and a first side surface and a second side surface opposed to each other in a width direction orthogonal to the stacking direction and the longitudinal direction;

multiple underlying electrodes including a first underlying electrode and a second underlying electrode located on the first surface; and multiple outer electrodes, in which the multiple inner electrodes include multiple first inner electrodes exposed on the first end surface and multiple second inner electrodes exposed on the second end surface, the multiple outer electrodes include:

a first outer electrode extending from the first end surface at least onto the first surface and connected to the multiple first inner electrodes and the first underlying electrode; and a second outer electrode extending from the second end surface at least onto the first surface and connected to the multiple second inner electrodes and the second underlying electrode, and each of the first underlying electrode and the second underlying electrode contains multiple aggregated sintered bodies composed of aggregated dielectric particles, and at least part of the multiple aggregated sintered bodies are located on an interface between each underlying electrode and the multilayer body.

(2) A multilayer electronic component including:

a multilayer body including multiple inner electrodes and multiple dielectric layers alternately stacked and including a first surface and a second surface opposed to each other in a stacking direction, a first side surface and a second side surface opposed to each other in a longitudinal direction orthogonal to the stacking direction, and a third side surface and a fourth side surface opposed to each other in a width direction orthogonal to the stacking direction and the longitudinal direction;

multiple underlying electrodes including first, second, third, and fourth underlying electrodes located on the first surface; and multiple outer electrodes, in which the multiple inner electrodes includes:

multiple first inner electrodes exposed at a first corner portion extending over the first side surface and the third side surface and a second corner portion extending over the second side surface and the fourth side surface; and multiple second inner electrodes exposed at a third corner portion extending over the first side surface and the fourth side surface and a fourth corner portion extending over the second side surface and the third side surface, the multiple outer electrodes includes:

a first outer electrode extending from the first corner portion at least onto the first surface and connected to the multiple first inner electrodes and the first underlying electrode;

a second outer electrode extending from the second corner portion at least onto the first surface and connected to the multiple first inner electrodes and the second underlying electrode;

a third outer electrode extending from the third corner portion at least onto the first surface and connected to the multiple second inner electrodes and the third underlying electrode; and a fourth outer electrode extending from the fourth corner portion at least onto the first surface and connected to the multiple second inner electrodes and the fourth underlying electrode, and each of the first underlying electrode, the second underlying electrode, the third underlying electrode, and the fourth underlying electrode contains multiple aggregated sintered bodies composed of aggregated dielectric particles, and at least part of the multiple aggregated sintered bodies are located on an interface between each underlying electrode and the multilayer body.

(3) The multilayer electronic component according to (1) or (2) mentioned above, in which the at least part of the multiple aggregated sintered bodies are formed by aggregation and sintering, each including one of multiple portions of the interface, and in a cross-sectional view of each underlying electrode in the stacking direction, a ratio of a length of the multiple portions to a length of the interface is 15% or more.

(4) The multilayer electronic component according to any of (1) to (3) mentioned above, in which in a cross-sectional view of each underlying electrode in the stacking direction, a ratio of an area of the multiple aggregated sintered bodies to a cross-sectional area of each underlying electrode is 21% or more and 44% or less.

(5) The multilayer electronic component according to any of (1) to (4) mentioned above, in which the at least part of the multiple aggregated sintered bodies are formed by aggregation and sintering, each including one of multiple portions of the interface, and the at least part of the multiple aggregated sintered bodies each have a shape protruding from the corresponding one of the multiple portions.

(6) The multilayer electronic component according to any of (1) to (5) mentioned above, in which the multiple underlying electrodes are not directly joined to the multiple inner electrodes.

(7) The multilayer electronic component according to any of (1) to (6) mentioned above, in which the multiple underlying electrodes do not contain a glass component.

(8) The multilayer electronic component according to any of (1) to (7) mentioned above, in which when it is assumed that a cross section of each of the multiple underlying electrodes in the stacking direction is equally divided into two regions in the stacking direction, a larger number of the multiple aggregated sintered bodies are present in the region away from the multilayer body than in the region close to the multilayer body.

(9) The multilayer electronic component according to any of (1) to (8) mentioned above, in which a dimension in the stacking direction is smaller than a dimension in the longitudinal direction and smaller than a dimension in the width direction.

What is claimed is:

1. A multilayer electronic component comprising:

a multilayer body comprising multiple inner electrodes and multiple dielectric layers alternately stacked and comprising a first surface and a second surface opposed to each other in a stacking direction;

multiple underlying electrodes comprising a first underlying electrode located on the first surface; and multiple outer electrodes each connected to one or more of the multiple inner electrodes and one or more of the multiple underlying electrodes, wherein in a cross-sectional view in the stacking direction, the first underlying electrode contains multiple sintered bodies composed of dielectric particles, and at least part of the multiple sintered bodies are located on an interface between the first underlying electrode and the multilayer body, and an average particle diameter of the dielectric particles contained in the sintered bodies is smaller than an average particle diameter of the dielectric particles contained in the dielectric layers.

2. The multilayer electronic component according to claim 1, wherein the at least part of the multiple sintered bodies each include one of multiple portions of the interface, and in a cross-sectional view of the first underlying electrode in the stacking direction, a ratio of a length of the multiple portions to a length of the interface is 15% or more.

3. The multilayer electronic component according to claim 1, wherein in a cross-sectional view of the first underlying electrode in the stacking direction, a ratio of an area of the multiple sintered bodies to a cross-sectional area of the first underlying electrode is 21% or more and 44% or less.

4. The multilayer electronic component according to claim 1, wherein the at least part of the multiple sintered bodies each include one of multiple portions of the interface, and the at least part of the multiple sintered bodies each have a shape protruding from the corresponding one of the multiple portions.

5. The multilayer electronic component according to claim 1, wherein the first underlying electrode is not directly joined to the multiple inner electrodes.

6. The multilayer electronic component according to claim 1, wherein the first underlying electrode does not contain a glass component.

7. The multilayer electronic component according to claim 1, wherein when it is assumed that a cross section of the first underlying electrode in the stacking direction is divided into two regions in the stacking direction, a larger number of the multiple sintered bodies are present in the region away from the multilayer body than in the region close to the multilayer body.

8. The multilayer electronic component according to claim 1, wherein at least part of the multiple sintered bodies in a cross section in the stacking direction are three-dimensionally linked and form a network.

9. The multilayer electronic component according to claim 1, wherein a dimension in the stacking direction is smaller than a dimension in a longitudinal direction and smaller than a dimension in a width direction.

10. The multilayer electronic component according to claim 1, wherein the multilayer body comprises:

a first side surface and a second side surface opposed to each other in a longitudinal direction orthogonal to the stacking direction; and a third side surface and a fourth side surface opposed to each other in a width direction orthogonal to the stacking direction and the longitudinal direction, the multiple underlying electrodes comprise second, third, and fourth underlying electrodes located on the first surface, the multiple inner electrodes comprise:

multiple first inner electrodes exposed at a first corner portion extending over the first side surface and the third side surface and a second corner portion extending over the second side surface and the fourth side surface; and multiple second inner electrodes exposed at a third corner portion extending over the first side surface and the fourth side surface and a fourth corner portion extending over the second side surface and the third side surface, the multiple outer electrodes comprise:

a first outer electrode extending from the first corner portion at least onto the first surface and connected to the multiple first inner electrodes and the first underlying electrode;

a second outer electrode extending from the second corner portion at least onto the first surface and connected to the multiple first inner electrodes and the second underlying electrode;

a third outer electrode extending from the third corner portion at least onto the first surface and connected to the multiple second inner electrodes and the third underlying electrode; and a fourth outer electrode extending from the fourth corner portion at least onto the first surface and connected to the multiple second inner electrodes and the fourth underlying electrode, and each of the second underlying electrode, the third underlying electrode, and the fourth underlying electrode, in a cross-sectional view in the stacking direction, comprises multiple sintered bodies, and at least part of the multiple sintered bodies are located on an interface between each underlying electrode and the multilayer body.

11. The multilayer electronic component according to claim 1, wherein the multilayer body comprises:

a first end surface and a second end surface opposed to each other in a longitudinal direction orthogonal to the stacking direction; and a first side surface and a second side surface opposed to each other in a width direction orthogonal to the stacking direction and the longitudinal direction, the multiple underlying electrodes comprise a second underlying electrode located on the first surface, the multiple inner electrodes comprise:

multiple first inner electrodes exposed on the first end surface; and multiple second inner electrodes exposed on the second end surface, the multiple outer electrodes comprise:

the first outer electrode extending from the first end surface at least onto the first surface and connected to the multiple first inner electrodes and the first underlying electrode; and the second outer electrode extending from the second end surface at least onto the first surface and connected to the multiple second inner electrodes and the second underlying electrode, and in a cross-sectional view in the stacking direction, the second underlying electrode comprises multiple sintered bodies, and at least part of the multiple sintered bodies are located on an interface between the second underlying electrode and the multilayer body.

12. A multilayer electronic component comprising:

a multilayer body comprising multiple inner electrodes and multiple dielectric layers alternately stacked and comprising a first surface and a second surface opposed to each other in a stacking direction;

multiple underlying electrodes comprising a first underlying electrode located on the first surface; and multiple outer electrodes each connected to one or more of the multiple inner electrodes and one or more of the multiple underlying electrodes, wherein in a cross-sectional view in the stacking direction, the first underlying electrode contains multiple sintered bodies composed of an aggregate of dielectric particles, and at least part of the multiple sintered bodies are located on an interface between the first underlying electrode and the multilayer body, the at least part of the multiple sintered bodies each include one of multiple portions of the interface, and the at least part of the multiple sintered bodies each have a shape protruding from the corresponding one of the multiple portions, the shape being wider on a side of the interface than on a side opposite thereto.

13. The multilayer electronic component according to claim 12, wherein an average particle diameter of the dielectric particles contained in the sintered bodies is smaller than an average particle diameter of the dielectric particles contained in the dielectric layers.

14. The multilayer electronic component according to claim 12, wherein in a cross-sectional view of the first underlying electrode in the stacking direction, a ratio of a length of the multiple portions to a length of the interface is 15% or more, and in the cross-sectional view of the first underlying electrode in the stacking direction, a ratio of an area of the multiple sintered bodies to a cross-sectional area of the first underlying electrode is 21% or more and 44% or less.

15. The multilayer electronic component according to claim 12, wherein the first underlying electrode does not contain a glass component.

16. The multilayer electronic component according to claim 15, wherein an average particle diameter of the dielectric particles contained in the sintered bodies is smaller than an average particle diameter of the dielectric particles contained in the dielectric layers.

17. The multilayer electronic component according to claim 12, wherein when it is assumed that a cross section of the first underlying electrode in the stacking direction is divided into two regions in the stacking direction, a larger number of the multiple sintered bodies are present in the region away from the multilayer body than in the region close to the multilayer body.

18. The multilayer electronic component according to claim 12, wherein at least part of the multiple sintered bodies in a cross section in the stacking direction are three-dimensionally linked and form a network.

* * * * *